United States Patent
Liao et al.

(10) Patent No.: US 9,622,322 B2
(45) Date of Patent: Apr. 11, 2017

(54) TASK LIGHT BASED SYSTEM AND GESTURE CONTROL

(71) Applicant: Sharp Laboratories of America, Inc., Camas, WA (US)

(72) Inventors: Miao Liao, Camas, WA (US); Xiao-Fan Feng, Camas, WA (US); Xu Chen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 285 days.

(21) Appl. No.: 14/138,826

(22) Filed: Dec. 23, 2013

(65) Prior Publication Data
US 2015/0181679 A1    Jun. 25, 2015

(51) Int. Cl.
*H05B 37/02* (2006.01)

(52) U.S. Cl.
CPC ................ *H05B 37/0227* (2013.01)

(58) Field of Classification Search
CPC ................................ H05B 37/0227
See application file for complete search history.

(56) References Cited

U.S. PATENT DOCUMENTS

| | | | |
|---|---|---|---|
| 6,724,159 B2 | 4/2004 | Gutta et al. | |
| 7,619,366 B2 | 11/2009 | Diederiks | |
| 8,269,722 B2 | 9/2012 | Wu et al. | |
| 8,290,210 B2 | 10/2012 | Fahn et al. | |
| 8,558,465 B2 | 10/2013 | Van Endert et al. | |
| 2009/0077504 A1* | 3/2009 | Bell | G06F 3/011 715/863 |
| 2012/0200494 A1 | 8/2012 | Perski et al. | |
| 2012/0206050 A1* | 8/2012 | Spero | B60Q 1/04 315/152 |
| 2013/0271004 A1 | 10/2013 | Min et al. | |
| 2014/0070959 A1* | 3/2014 | Bhargava | H04Q 9/00 340/870.07 |
| 2015/0002808 A1* | 1/2015 | Rizzo, III | A61F 9/08 351/158 |
| 2015/0023019 A1* | 1/2015 | Chen | H05B 33/0803 362/276 |

FOREIGN PATENT DOCUMENTS

| | | |
|---|---|---|
| GB | 2489394 A | 3/2012 |
| WO | 2009128064 A2 | 10/2009 |
| WO | 2011045789 A1 | 4/2011 |
| WO | 2012081012 A1 | 6/2012 |
| WO | 2012126103 A1 | 9/2012 |
| WO | 2012139241 A1 | 10/2012 |
| WO | 2012164562 A1 | 12/2012 |
| WO | 2013008236 A1 | 1/2013 |
| WO | 2013021385 A2 | 2/2013 |
| WO | 2013071013 A1 | 5/2013 |
| WO | 2013124845 A1 | 8/2013 |
| WO | 2013136333 A1 | 9/2013 |

\* cited by examiner

*Primary Examiner* — David F Dunphy
(74) *Attorney, Agent, or Firm* — Chernoff Vilhauer McClung & Stenzel, LLP

(57) ABSTRACT

A system that determines the task of the viewer and/or gestures made by the user. Based upon the determined task and/or the gestures, the lighting provided to the viewer may be modified.

24 Claims, 31 Drawing Sheets

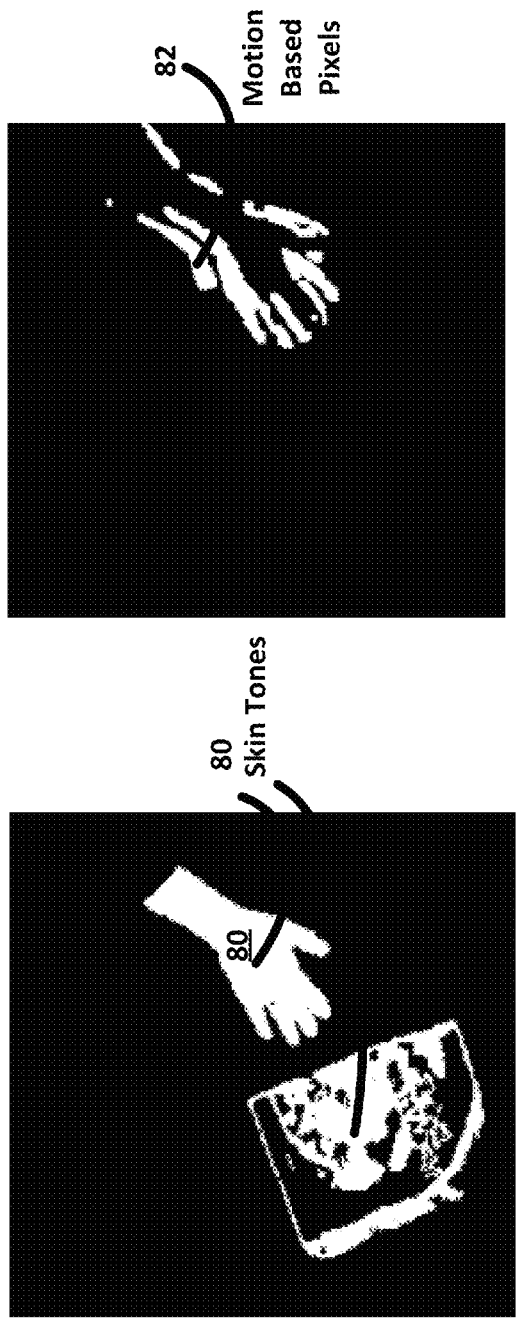
FIG. 8A
FIG. 8B
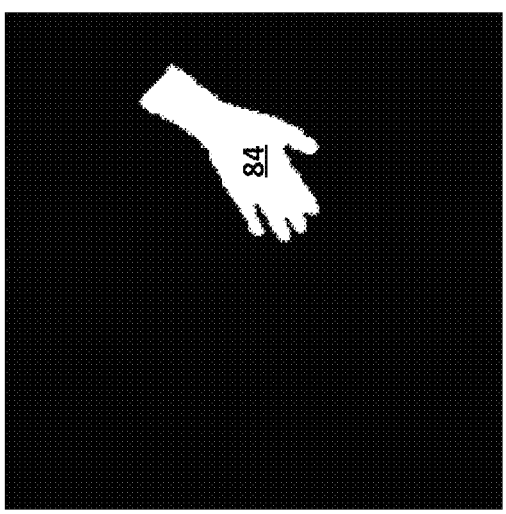
FIG. 8C

DISTANCE MAP 710

EDGE IMAGE 700

TASK LIGHT BASED SYSTEM AND GESTURE CONTROL

CROSS-REFERENCE TO RELATED APPLICATIONS

None.

BACKGROUND OF THE INVENTION

The present invention relates to a task based lighting system and gesture control.

Ever since the advent of controlled fire, lighting has been widely used to extend the time that people can stay up in the night to perform useful tasks, such as cooking and reading.

Existing indoor lighting uses one or more light sources, such as incandescent bulbs, fluorescent bulbs, and light emitting diode based light sources. The indoor lighting is used for a variety of different purposes, such as living environments, work environments, and accent lighting. Such indoor lighting permits the modification of five principal lighting properties: (1) intensity, (2) spatial distribution, (3) color spectra, (4) timing and (5) duration. Each of these properties may be individually controlled by one or more manual light switches.

Existing lighting control systems typically permit the use of time schedules, occupancy sensor control, and photo detection for daylight harvesting. Systems may also use wired or wireless digital addressable lighting interface (DALI) to control the light both locally and remotely.

Lighting control systems have increased the convenience of using lighting devices. However, the selection of one of the modifications to the lighting is either based upon user selection or a rule defined by the user, such as adjusting the sensitivity of motion sensor and/or adjusting the light level that trigger the daylight harvesting.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 8A illustrates skin tone regions of an image.
FIG. 8B illustrates motion based regions of an image.
FIG. 8C illustrates the combined regions of FIGS. 8A and 8B.

DETAILED DESCRIPTION OF PREFERRED EMBODIMENT

It was determined that lighting that is located in a stationary position may be preferably modified in its properties depending on the current task of the viewer. For example, in a restaurant, the light level should be relatively low since glare will impede a dinner conversation. However, when the menu is provided and viewed by the patron, such as by raising the menu to view or otherwise opening the menu, the light level should be increased to facilitate more readily reading the menu. After the patron has viewed the menu, or otherwise closed the menu, the light level should be lowered to a suitable level for dinner conversation.

For example, in an office the lighting levels would preferably be different for computer work, and reading and/or writing. For computer work, the light level is preferably relatively low to reduce glare which can lead to computer vision syndrome. However, when reading and/or writing the light level should be increased to facilitate more readily reading and/or writing.

For example, in a living room when sitting on a couch, the lighting levels would preferably be different for viewing television (e.g., video content), and reading and/or writing. For viewing the television, the light level is preferably relatively low to reduce glare which may otherwise lead to viewing problems. However, when reading and/or writing the light level should be increased to facilitate more readily reading and/or writing.

To achieve these different lighting levels for performing different tasks in the same environment, it is desirable for a lighting control system that recognizes human actions and in response selects the appropriate lighting. For example, depending on the recognized human actions, (1) intensity, (2) spatial distribution, (3) color spectra, (4) timing, and/or (5) duration may be modified. The modification may further be based upon the time of the day and/or the ambient lighting conditions.

Figure 1:
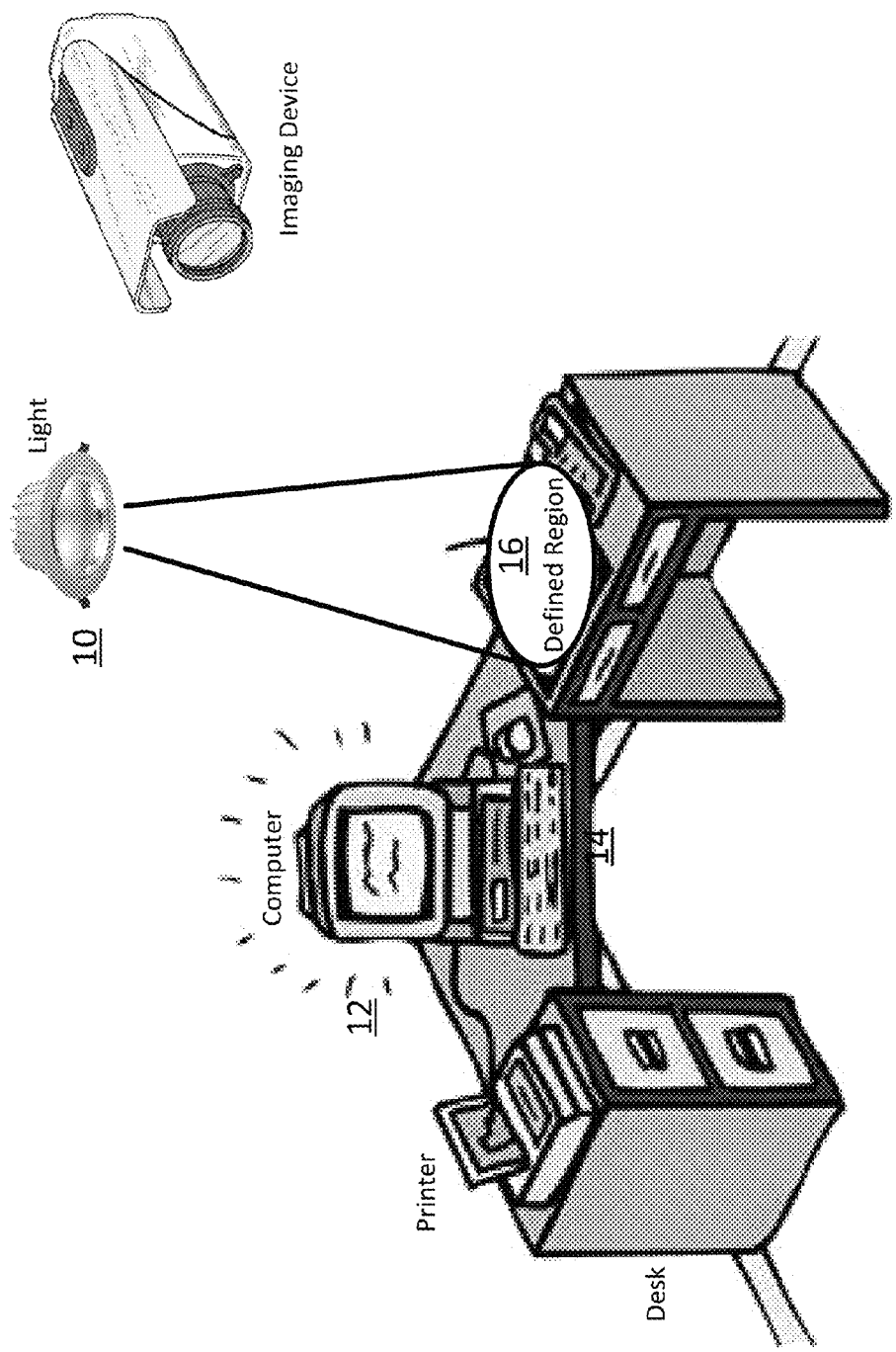
FIG. 1 illustrates an office lighting environment.

FIG. 1 illustrates office lighting 10. For office lighting, the viewer is typically using the computer 12 when the hands are proximate the keyboard 14. For office lighting, the viewer is typically reading and/or writing when the hands are in a defined region.

Figure 2:
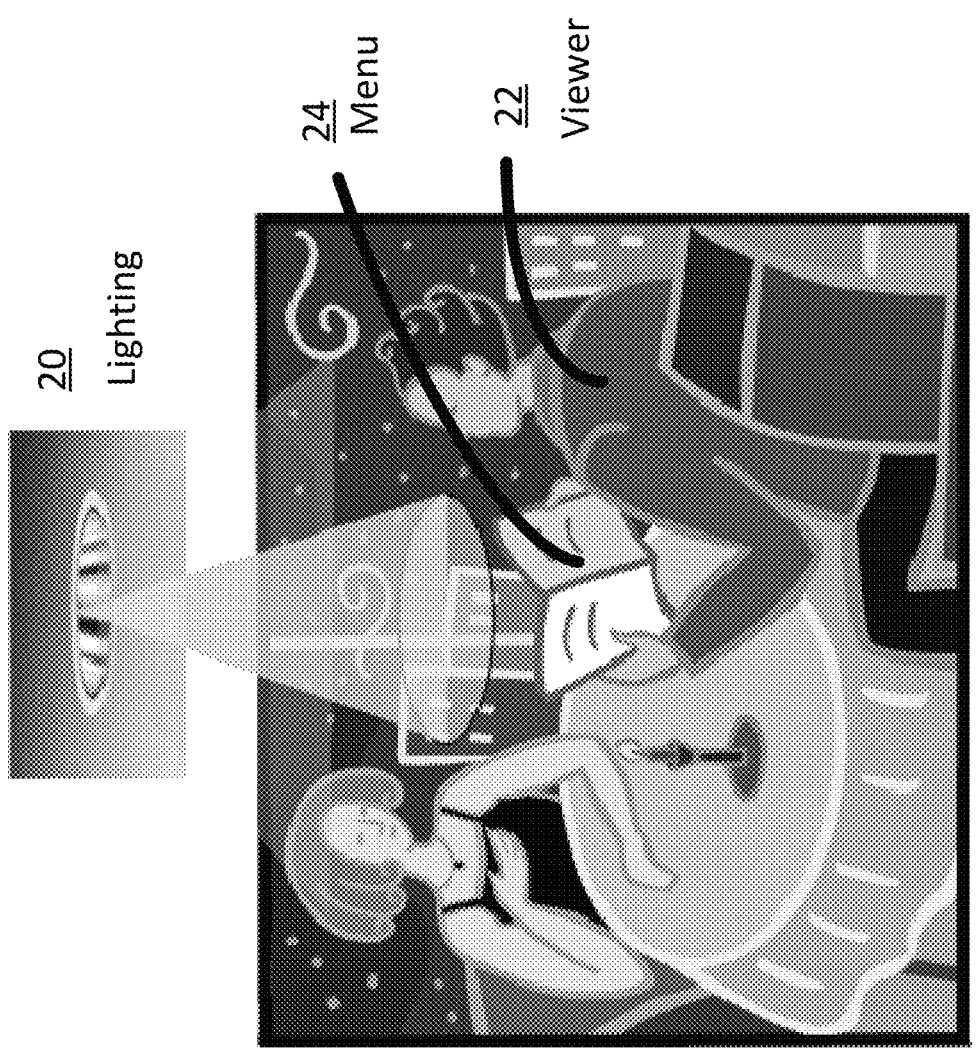
FIG. 2 illustrates a restaurant lighting environment.

FIG. 2 illustrates restaurant lighting 20. For restaurant lighting, the viewer 22 is typically viewing the menu 24 when the menu is upright in the hands of the viewer and/or the menu is opened. For restaurant lighting, the viewer is typically in conversation when the menu is not upright in the hands of the viewer and/or the menu is not opened.

Figure 3:
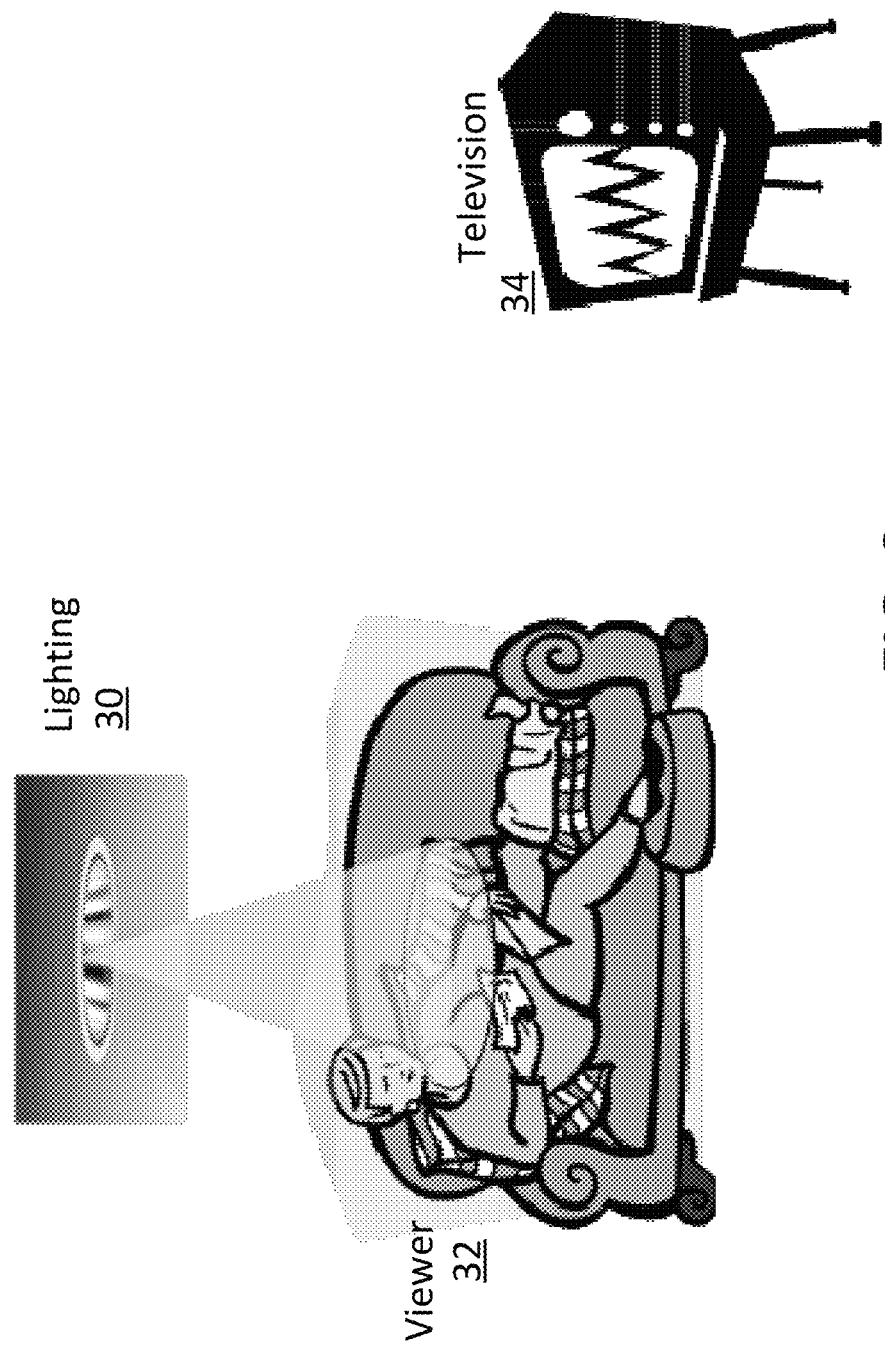
FIG. 3 illustrates a living room lighting environment.

FIG. 3 illustrates living room lighting 30. For living room lighting, the viewer 32 is typically viewing the television 34 when the television is operating. For living room lighting, the viewer is typically in conversation, reading, and/or writing when the television is not operating.

Figure 4:
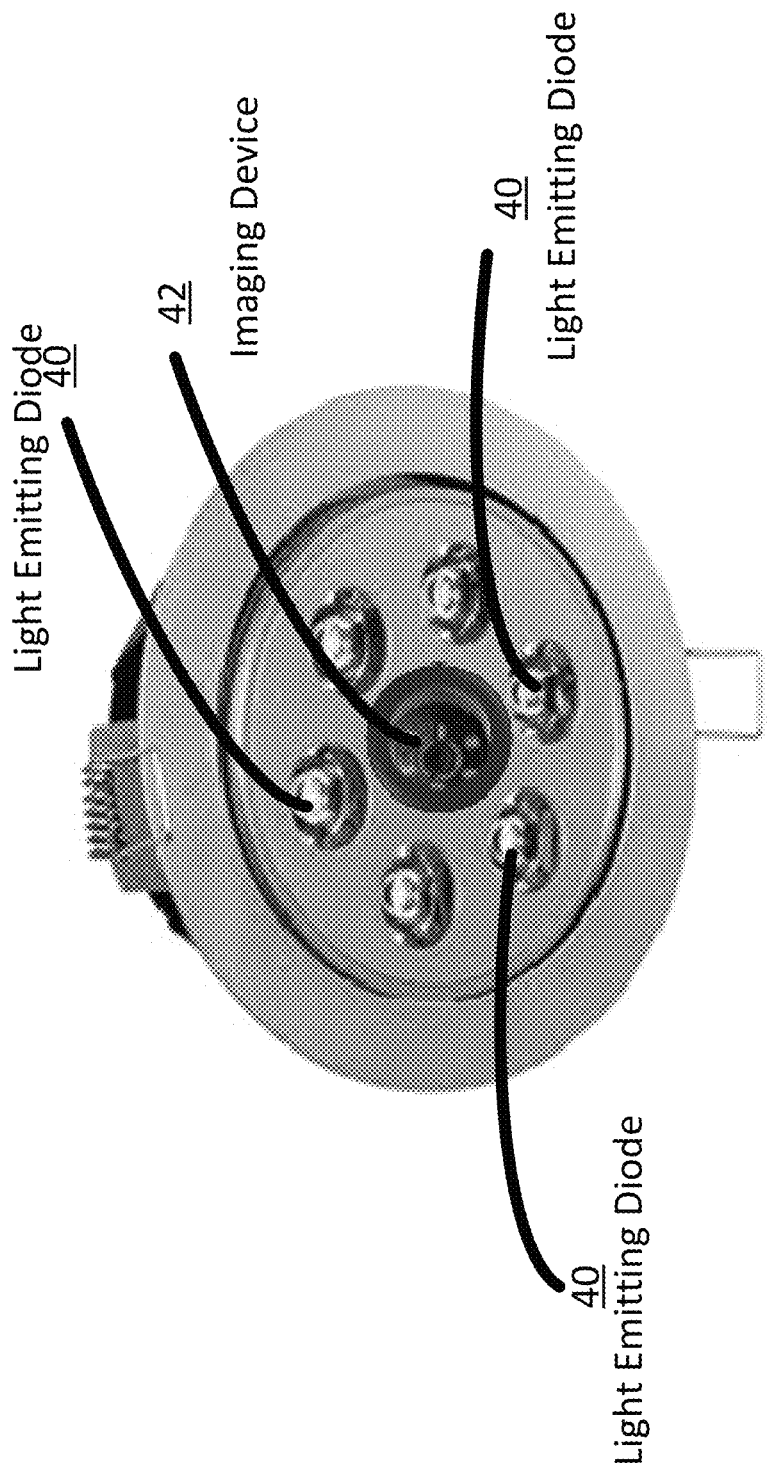
FIG. 4 illustrates a lighting element together with an imaging device.

Referring to FIG. 4, a particular lighting element 40, or group of lighting elements, may include a lighting element such as a LED fixture together with an imaging device 42, such as a camera. The camera is arranged to capture images at least partially overlapping with the field of illumination (e.g., volume, area, region) of the lighting element. Depending on the particular task, the field of view of the imaging device may be larger than that of the lighting element, the same as that of the lighting element, or smaller than that of the lighting element. With the same image capture of the imaging device, typically a smaller field of view results in a greater resolution of the captured image(s).

Figure 5:
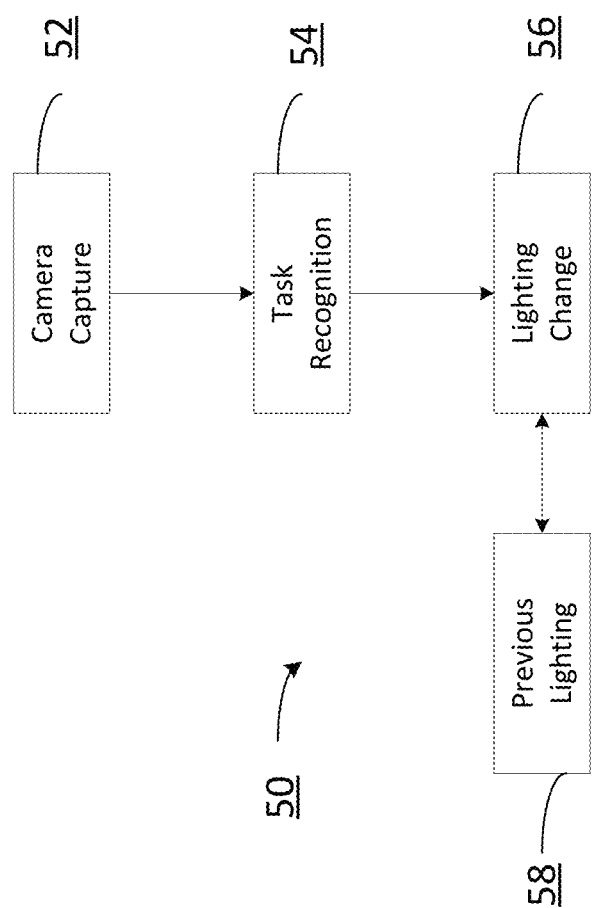
FIG. 5 illustrates a vision based lighting control system.

Referring to FIG. 5, a vision based lighting control system 50 is illustrated. An imaging device, such as a camera, captures 52 an image within its field of view. The captured image from the field of view of the imaging device is provided to a task recognition process 54. The task recognition process 54 determines the current task being performed, such as typing on a keyboard, reading a menu, watching television, reading and/or writing, and determines a suitable adjustment to the current lighting. The task recognition process may signal the desired lighting to a lighting change process 56. To reduce the potential for flickering, it is desirable to modify the lighting on a gradual basis, so the modified lighting may be further based upon the previous lighting condition(s) 58. For example, the NewLevel=(1−k)*OldLevel+k*TargetLevel, where k is the rate of change of the light. Using a large k value results in a faster response while a smaller k value results in a slower response.

Figure 6:
FIG. 6 illustrates an office environment and an illuminated area.

Referring to FIG. 6, for an office environment 60, such as a corporate office cubicle, the field of view of task lighting typically covers only part of the cubicle area that is designed for reading and writing 64, while a separate area 62 may be designed for computer use. The imaging device associated with the lighting element preferably has a wider field of view than the area of the light source, such as substantially all of the cubicle area. A geometrical calibration may be performed between the imaging device and the light source to select which part of the captured image is illuminated by the light source 64. The region of interest of the illuminated light region may be stored as an imaging parameter for subsequent task determination purposes.

The lighting control system preferably discriminates between two different user activities, namely, (1) computer work, and (2) reading and/or writing. Reading and/or writing may be characterized by the presence of the hand in the region of interest in the captured image. Computer work may be characterized by the presence of a hand, such as one proximate a computer mouse and/or computer keyboard. Other characterizations may likewise be used to discriminate between computer work, and reading and/or writing.

Figure 7:
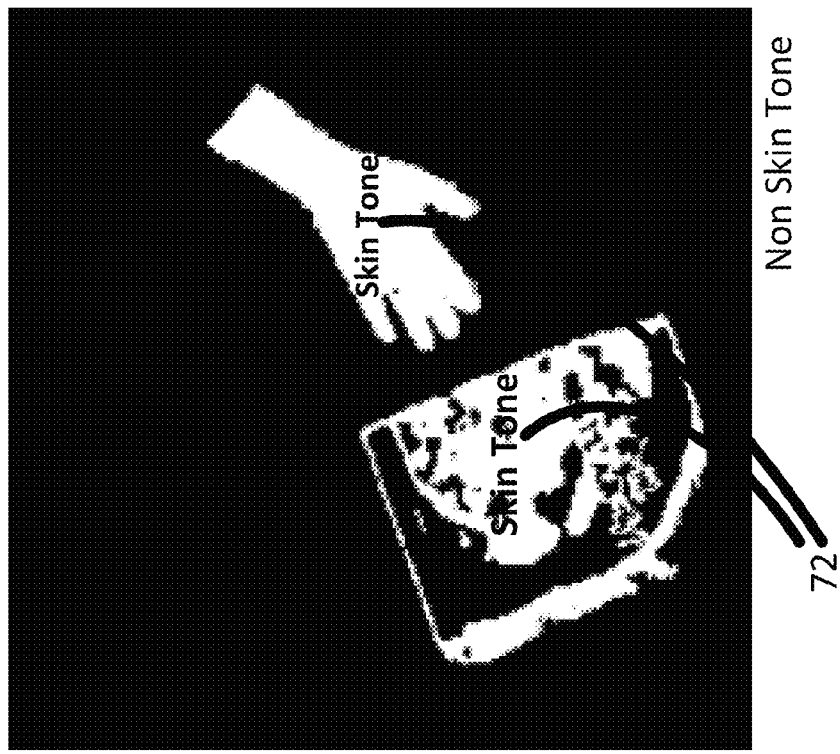
FIG. 7 illustrates a keyboard and hand, and a binary mask of the same.
Figure 7:
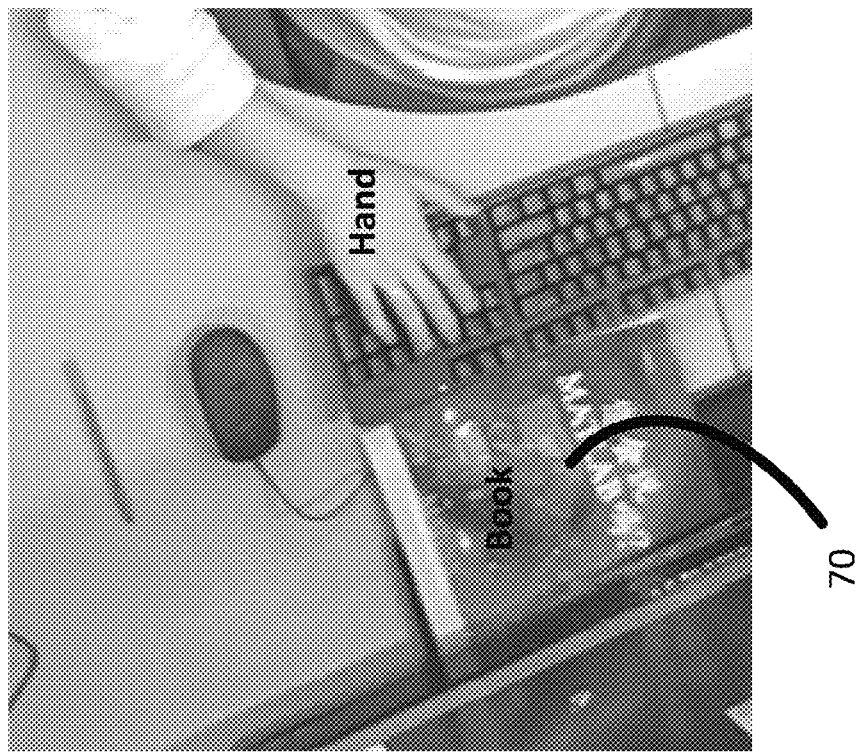

Referring to FIG. 7, the detection of the user's hand may be achieved through the combination of skin color detection and/or motion detection. A skin color model may be selected or otherwise learned based upon a dataset of hand images. The color of the hand may be determined in any suitable color space, such as in a HSV color space or in a YCC color space. With the establishment of a skin color model, the pixels of the captured images 70 are classified as a skin tone or a non-skin tone 72, with proximate skin tone pixels being grouped together into "blobs" to form candidate hand detections.

In some cases, the skin tone determination may not be sufficiently unique to determine a hand in the image if other objects have a similar color, such as the book of FIG. 7. To further discriminate skin tone regions as being a hand, motion information may be used. For example, the system may assume that people's hands are not maintained static for a long period of time in a cubicle environment. The motion detection for the captured image may be used to determine pixel intensity variations, if any, over time. The intensity variations may be computed as the difference between the current frame and a previously captured frame to determine if a threshold has been achieved. In some situations when the motion of the hand is minor, the differences between sequentially captured images may be relatively low, such as below the threshold. In order to detect the movement of the hand in the case of relatively minor movement, the system may compare the current image with an image obtained N captured images earlier. In other situations, it may be desirable to use other movement detection techniques, such as optical flow.

The detection of skin tone may be combined with the motion detection to reduce the number of false positive hand detections. Both the detection of the skin tone and the motion detection may be determined in the form of binary masks, which are computationally efficient, where non-zero pixel values indicate the presence of the skin tone and the motion detection. The two masks may be combined using an "and" operation. The result of the combination of the two masks is where non-zero pixels indicate the presence of both skin tones and motion which has an increased likelihood of being the user's hand.

By way of example referring to FIG. 8A, the skin tone pixels 80 within the image are identified, together with those proximate one another being considered as skin tones. Referring to FIG. 8B, the motion based pixels 82 within the image are identified, in a desirable manner. Referring to FIG. 8C, the combination of the hand tone pixels of FIG. 8A and the motion based pixels of FIG. 8B are combined together which provides an improved identification of the user's hand 84.

Figure 9:
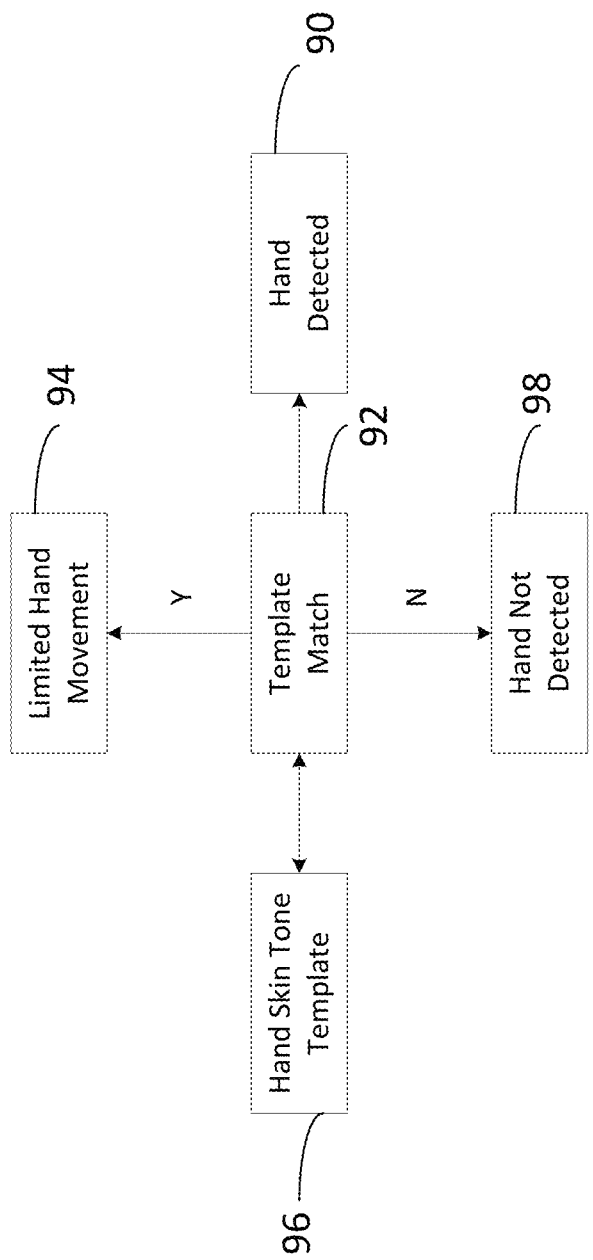
FIG. 9 illustrates a template matching process for a hand.

Referring to FIG. 9, in a cubicle environment the user's hands stop moving from time to time. During these times of no or limited hand movement 90 it is desirable to still detect the presence of the hands. For example, the user may have started to read a book. While hand motion can likely be detected at the beginning of this activity and periodically during the reading activity, the user may also hold his/her hands still while reading. The motion detection process may not detect the hands when the hands stop moving. A modified hand detection process may include using a template matching technique 92. One or more images of the detected hand (based upon skin tone and motion) may be stored. When insufficient motion 94 is detected for the current captured image, then the stored one or more images of the detected hand may be used as templates 96 to identify sufficiently similar images. In the event that the template matching fails 98, then the system may presume that the hand has moved out of the region of interest of the imaging device.

As previously described, an object having a skin tone may be differentiated as being a hand by motion. However, if another object is moved by any other mechanism, it may be classified as a human hand, even if it keeps static after that movement. The system should reject these other moving objects and preserve hands. The rejection criterion may be based on the observation that the user's hands don't keep static for a very long time while most objects in this environment do. So, for each detected hand candidate, the system may track the time it remains static. If the time of remaining static is greater than a threshold, then the detected hand candidate may be rejected as a hand.

From time to time, people retrieve their hands out of the reading area even if they keep on reading. So, the system may maintain the light on even if no hand is detected in the reading area. To detect if the hands are retrieved from the reading area the system may track the magnitude of the motion of the user after the hands move out of the reading area. If sufficiently large motion of the user is detected, the system may consider that the user has switched to other tasks and a timer is started, which upon a sufficient duration the light level is changed. Otherwise, if sufficiently large motion of the user is not detected, the system may consider that the user is still reading, so the light level should be maintained. The motion detection technique to determine if the user is moving may be the same technique used for the motion detection technique for the hand, or different, as desired.

Figure 10:
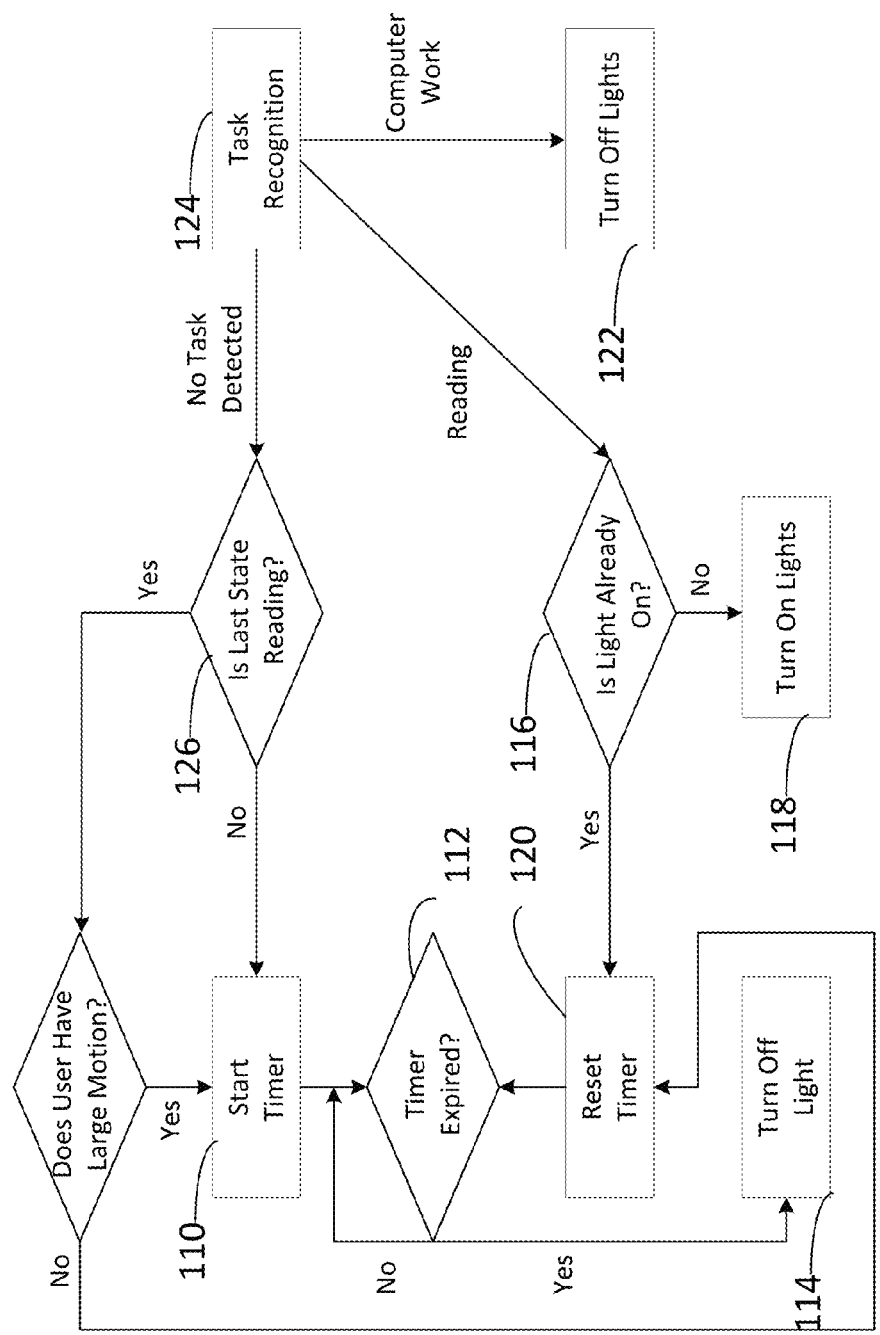
FIG. 10 illustrates a task discrimination process.

Referring to FIG. 10, with the discrimination between the different tasks for an office space, such as an office cubicle, the light may be automatically adjusted to facilitate the task for the user. The light may be adjusted based upon, for example, the detection of hands. For example, if no task is detected 126, the system is unsure whether the user desires to continue to use the light or not. With this uncertainty, it is preferable to keep the light on for a limited duration, waiting for the user to undertake an action to reduce the uncertainty. This uncertainty may be resolved by using a timer 110, if desired. Accordingly, once the timer expires 112 the light may be automatically reduced or turned off 114. If reading is detected 124, then the system may check the light status. If the light is off, then the system may turn on the light 118. If the light is already on, the system may reset the timer 120. If computer work is detected, the light may be reduced 122.

Figure 11:
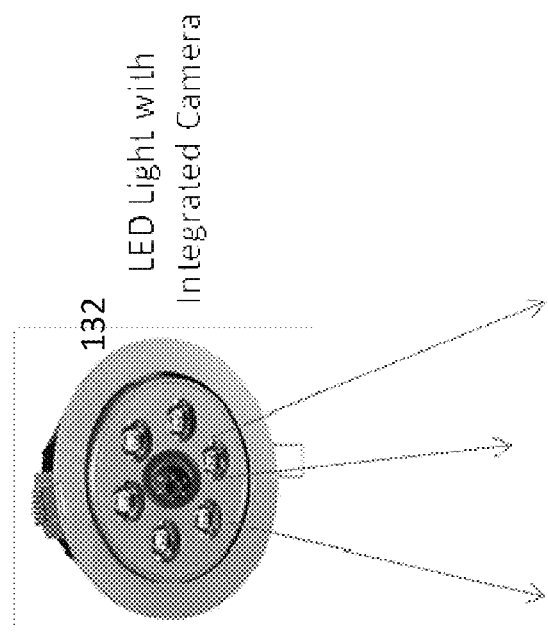
FIG. 11 illustrates an imaging device and a retro-reflective menu.
Figure 11:
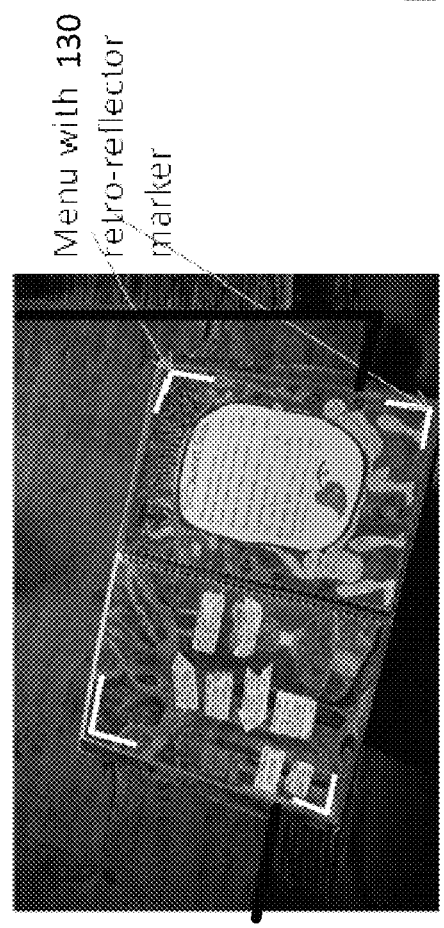

Referring to FIG. 11, the restaurant menu may include retro-reflective material that enables the imaging device included with the light fixture to detect the retro-reflective mark(s) 130 on the menu even the illumination level is at a low level. When the customer opens the menu, the light from the light source strikes the retro-reflective mark(s) and resulting reflected light is captured by the imaging device of the light fixture 132. When the open menu is detected, the illumination level should gradually increase to a comfortable reading level. When the menu is closed, the illumination level should gradually decrease to a comfortable discussion level.

Figure 12:
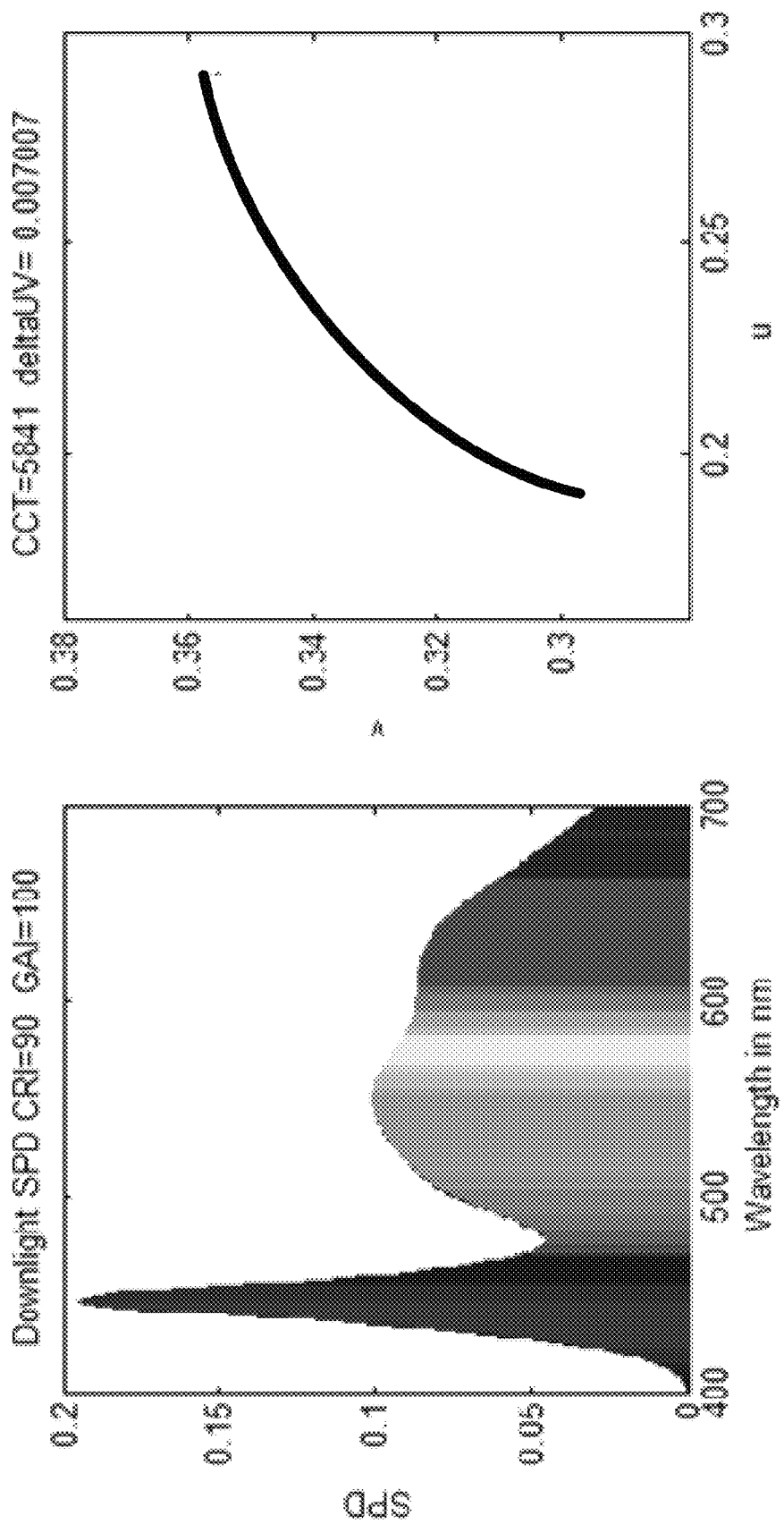
FIG. 12 illustrates cool light for morning reading/writing tasks.
Figure 13:
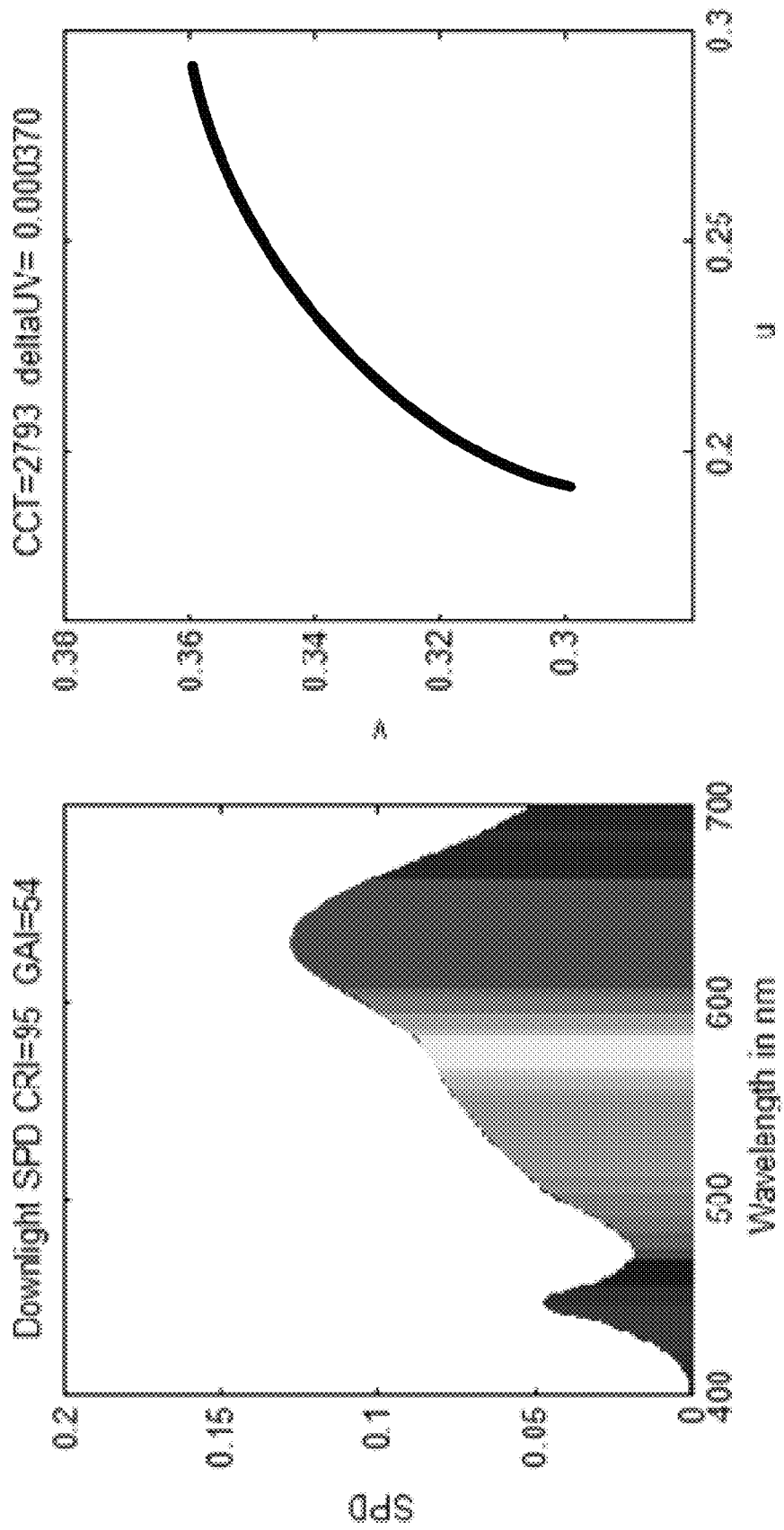
FIG. 13 illustrates warm light for evening reading/writing tasks.

In addition to the lighting intensity, the light spectra may be adjusted based on the recognized tasks. The light spectra may further be adjusted based upon the time of the day, personal preferences, and the user's previous light exposure. Referring to FIG. 12 for example, cool light (high CCT) with more blue may be preferred for morning reading and/or writing tasks. Referring to FIG. 13 for example, warm light with less blue may be preferred for evening reading on the couch.

Figure 14:
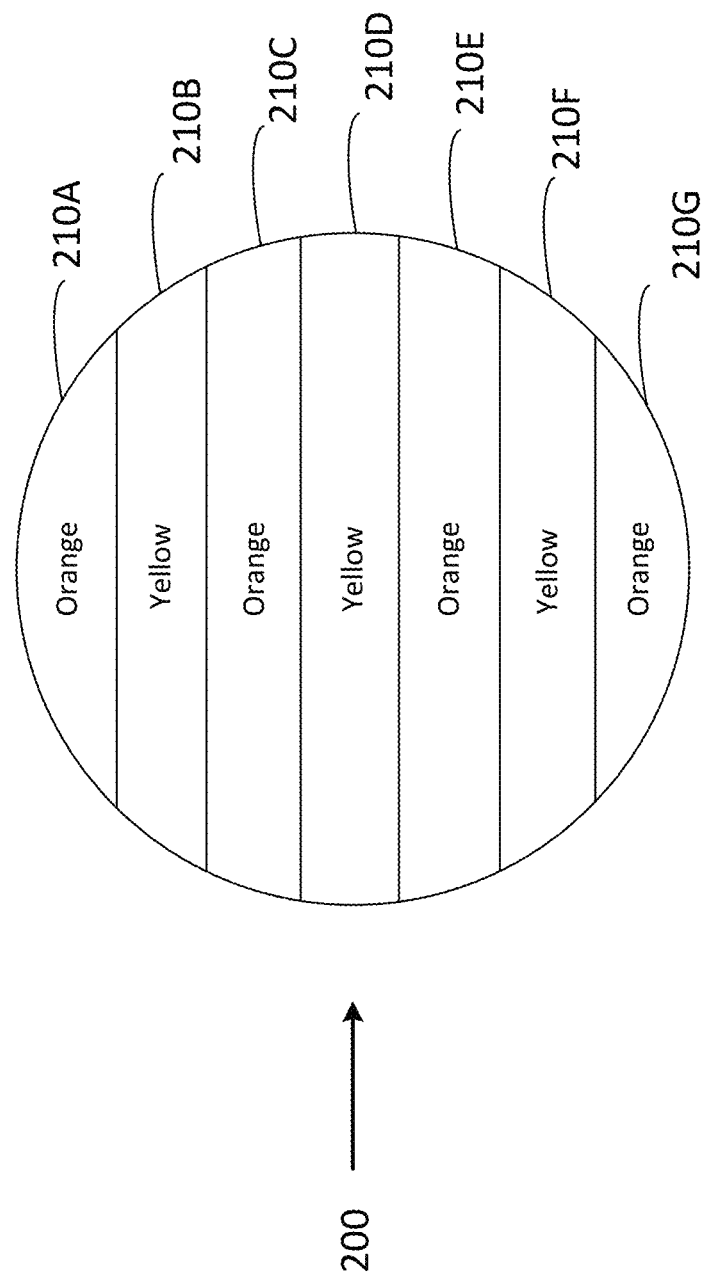
FIG. 14 illustrates a light source with two strips.

Referring to FIG. 14, one technique to implement different spectra within a single light fixture 200 is to use an imaging device with two sets of phosphors. Each of the stripes 210A-210G is controlled by a corresponding driver circuit, which may be a pulse width modulated signal for a light emitting diode based imaging device. The combination of the two phosphor strips may produce light with a suitable range of colors.

Figure 15:
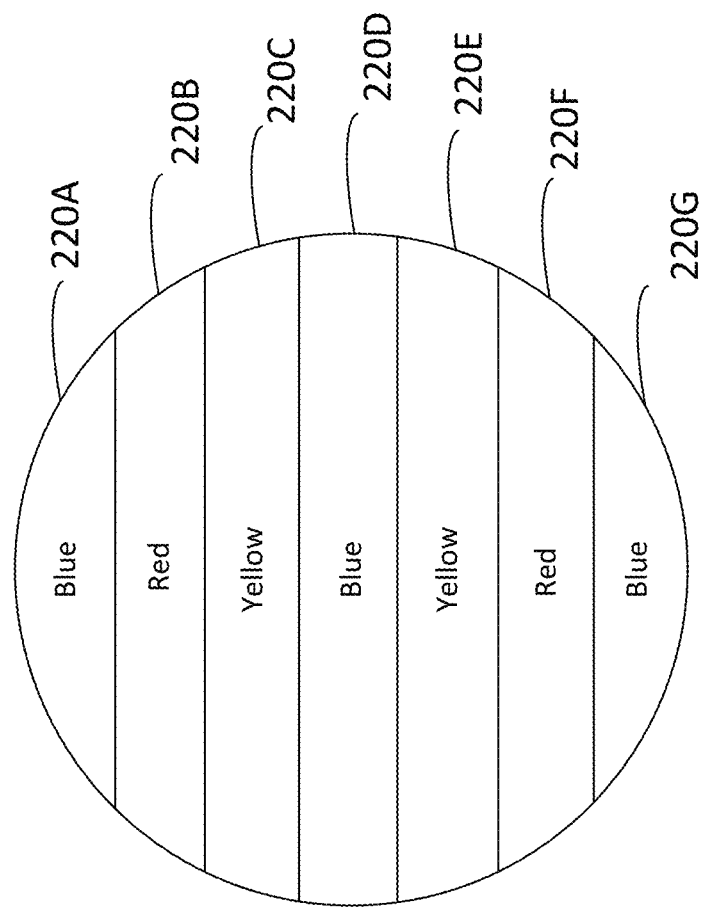
FIG. 15 illustrates a light source with three stripes.
Figure 16:
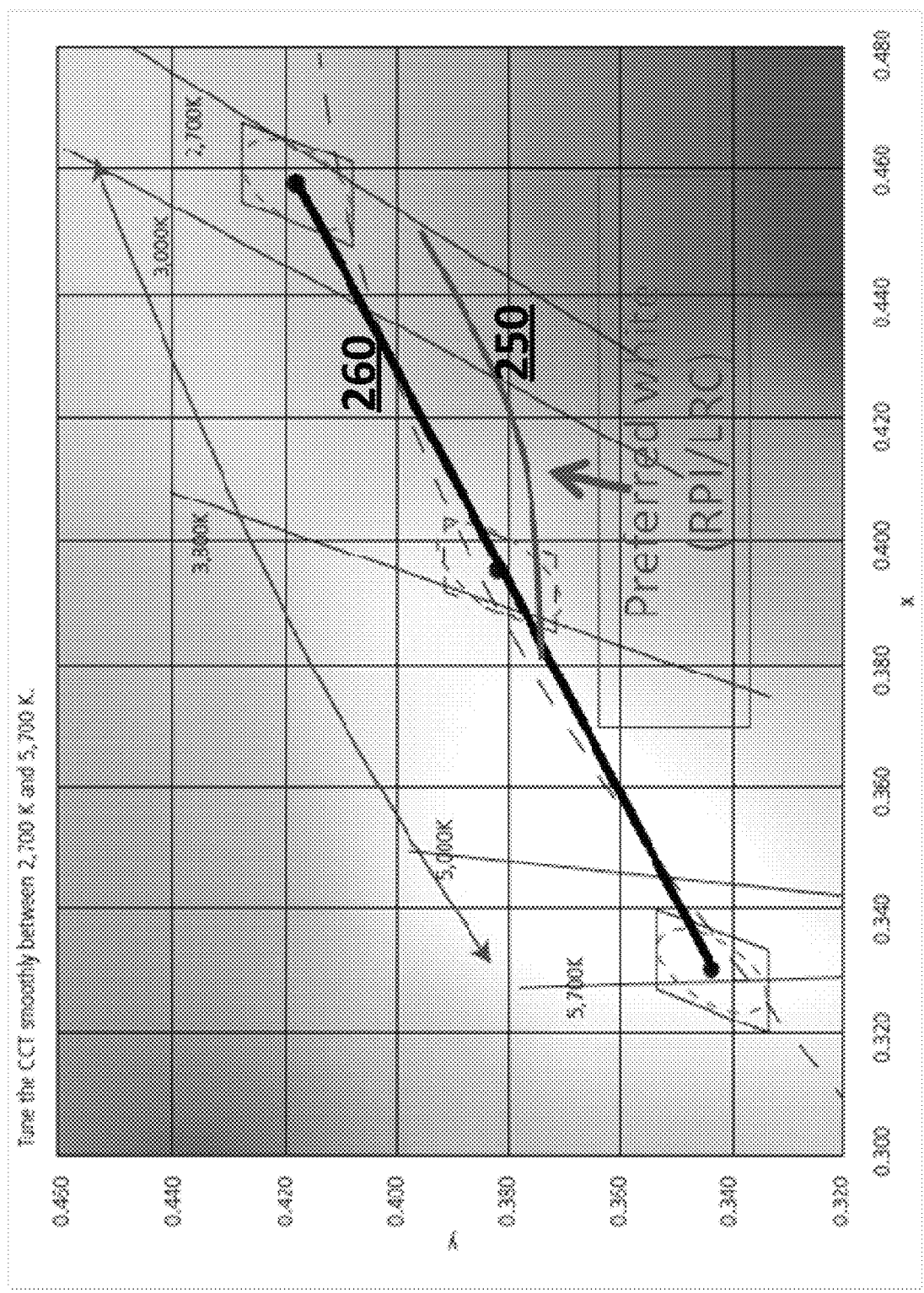
FIG. 16 illustrates a preferred white region.

Referring to FIG. 15, for additional illumination control three or more strips 220A-220G may be used. The correlated color temperature (CCT) may be changed, and if desired, it may be tuned with the relative weights of the three illumination elements to adjust the output light to be on the blackbody locus to achieve true white. The light may also be adjusted to be above or below the blackbody curve, depending on personal preference. Referring to FIG. 16, the preferred white light 250 is below the blackbody locus 260 at lower CCTs.

While the determination of particular tasks of the user is desirable for modification of the lighting system, it is also desirable that the modification of the lighting system may be based upon different hand gestures. Such hand gestures may include static gestures or hand signs, as well as dynamic gestures or moving gestures. In particular, hand gestures may be used to toggle the light illumination and another hand gesture may be used to tune the light brightness, such as sliding of a particular hand gesture. For example, the system may distinguish reading and writing, and computer work activities of a user, and turn the light on (e.g., increase illumination) and off (e.g., decrease illumination) accordingly. Further, the system may detect and track different types of hand gestures and in response change the light status and/or brightness based on these gestures. Also, the system may allow a user to define the regions of activities using the combination of hand gestures. In this manner, automatic lighting control may be based on user activity detection and/or user activity recognition, such as for example, manual lighting control based on hand gesture detection, light brightness tuning based on hand gesture tracking, rotation invariant gesture recognition, and a combination of hand gestures to define effective activity regions.

Figure 17:
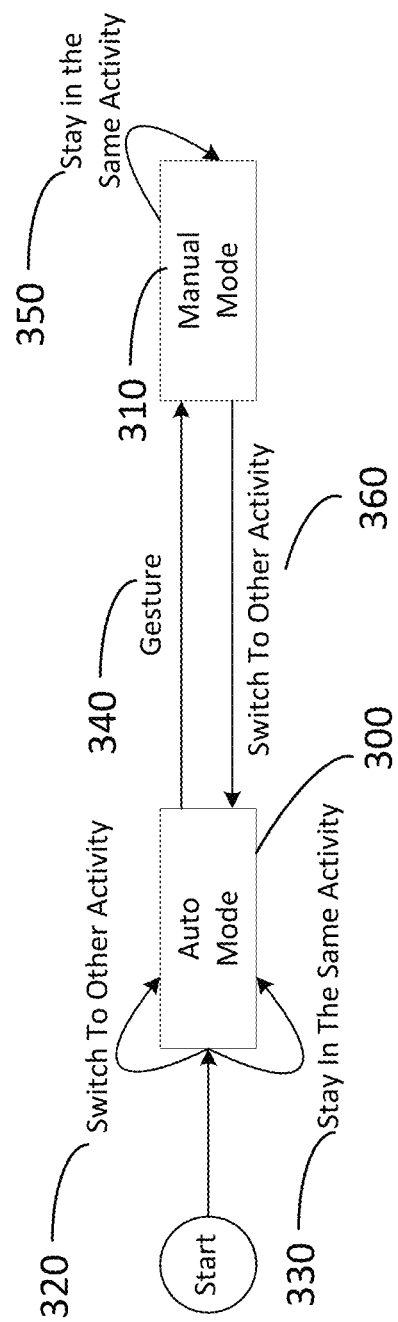
FIG. 17 illustrates an auto mode and a manual mode.

Referring to FIG. 17, as previously described, the system may include both automatic 300 and manual 310 control of the light status, and achieve seamless switching between them. In the automatic control mode, the system discriminates between user activities, namely, reading and writing, and computer work without explicit input from the user. When reading or writing is detected, the system turns on or otherwise increases the light automatically, and keeps the light on unless a user switches to computer work 320. When a user switches to computer work, the system turns off or otherwise reduces the light 330. Therefore, by default, a user does not get any light (or gets reduced light) when working on computer and gets light (or gets increased light) when reading and writing. The additional manual control option 310 permits the user to override the default lighting options using a simple hand sign or gesture. So, when a user desires additional light while working on the computer, the user shows the light-on gesture 340. On the other hand, if the user does not need light during reading and writing, the user shows the light-off gesture. While the light is on, a user can tune its brightness using a sliding gesture independently of whether the user is working on the computer, or reading and writing 350. Once a user starts controlling the amount of light being emitted by gestures, the system may enter manual control mode and stay in that mode until the user changes the current activities 360.

The system may use pre-defined reading and writing, and computer work regions for the activity detection. The system may rely on the user to define these two regions by hand gestures, as explained later.

Figure 18:
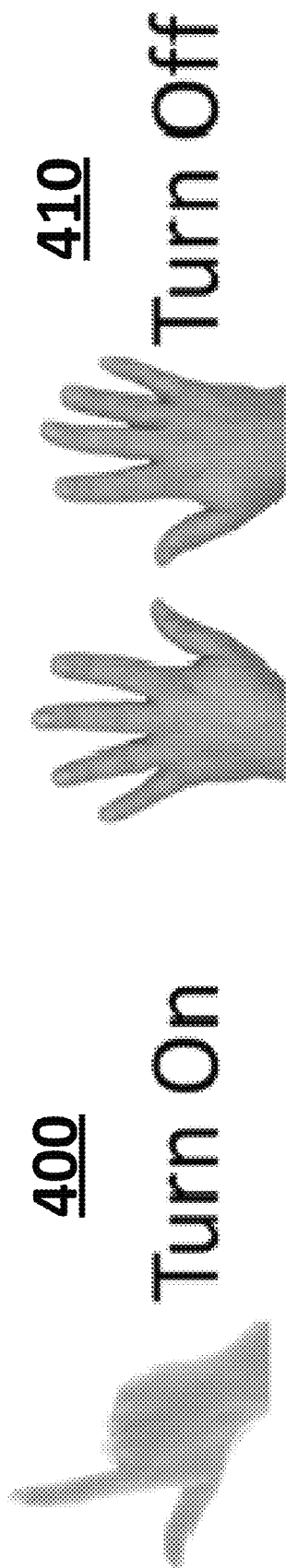
FIG. 18 illustrates hand gestures for on/off/up/down.
Figure 18:

Referring to FIG. 18, gestures may be used to control the light. The upper left gesture may be referred to as "gesture 8" 400. A static gesture 8 of either hand turns on (or higher illumination) the light if it's previously off (or reduced illumination). The upper right gesture may be referred to as "5 finger gesture" 410. A static 5 finger gesture of both hands indicates the user's intention to turn off (or lower illumination) the light. In this case, both hands may be used, because users may unintentionally show 5 finger gesture of one hand from time to time. When the light is on, the user can use a sliding gesture 8 420 to increase and decrease the light brightness. In particular, sliding towards the thumb direction may decrease the light brightness, and vice versa.

Figure 19:
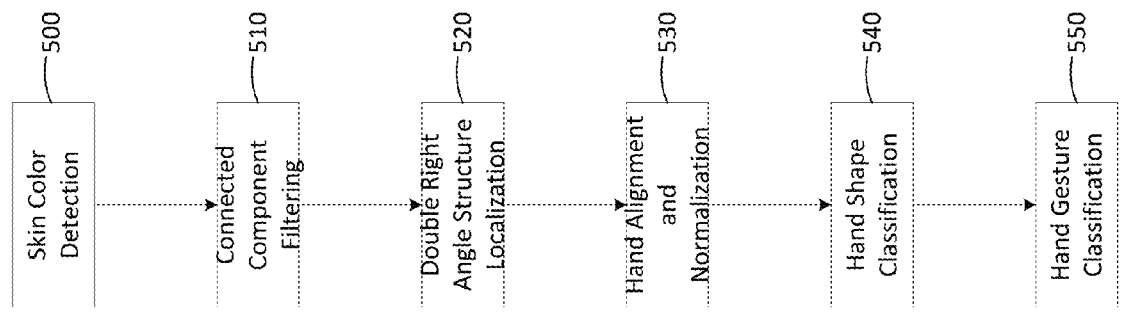
FIG. 19 illustrates hang gesture classification.

Referring to FIG. 19, an exemplary gesture detection and tracking technique is illustrated. Any desired exemplary gesture detection and tracking system may be used, as desired. A skin color (e.g., tone) model may be learned from a dataset of hand images from different people. The color may be represented, for example, in either HSV color space or YCC color space. Once a skin color model is established, each pixel of the input frame is classified as skin tone or non-skin tone by a skin tone detection process 500. Connected skin pixels are grouped together into blobs as candidate hand detections by a connected component filtering process 510. Noise and some object of skin color may exist in the resulting binary mask. The system may filter out some of the connected components that are highly unlike to be a hand. The filtering may be based on the observation that a hand is a connected component of sufficiently large size in the binary image. Isolated blobs that are smaller than a threshold may be removed from the binary image.

Figure 20:
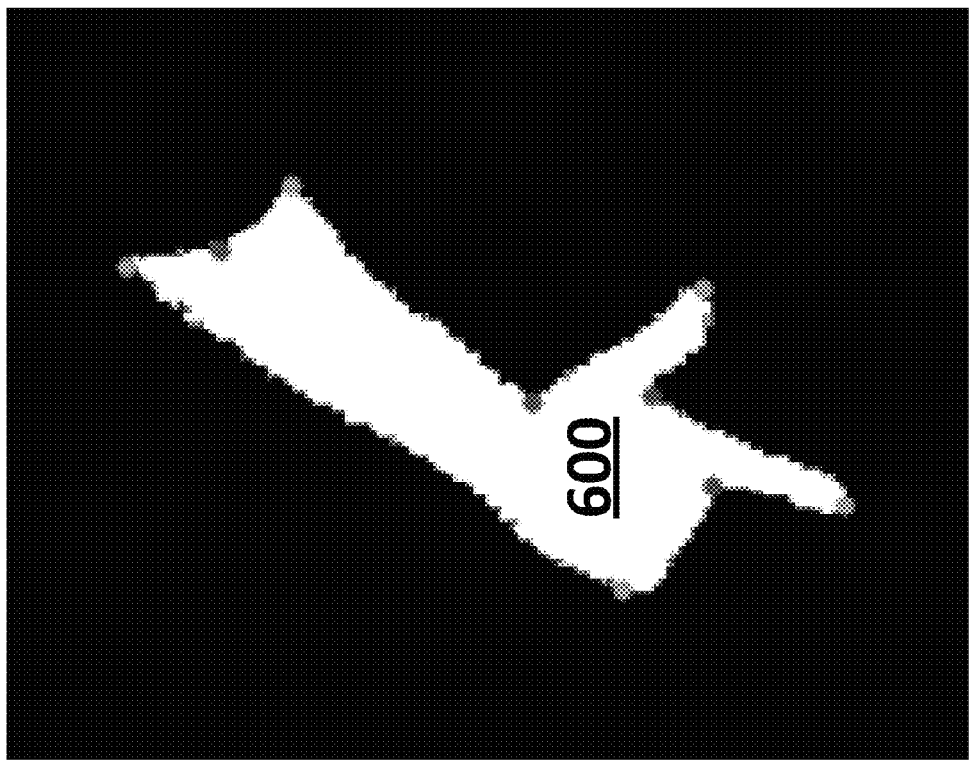
FIG. 20 illustrates a hand gesture.
Figure 21:
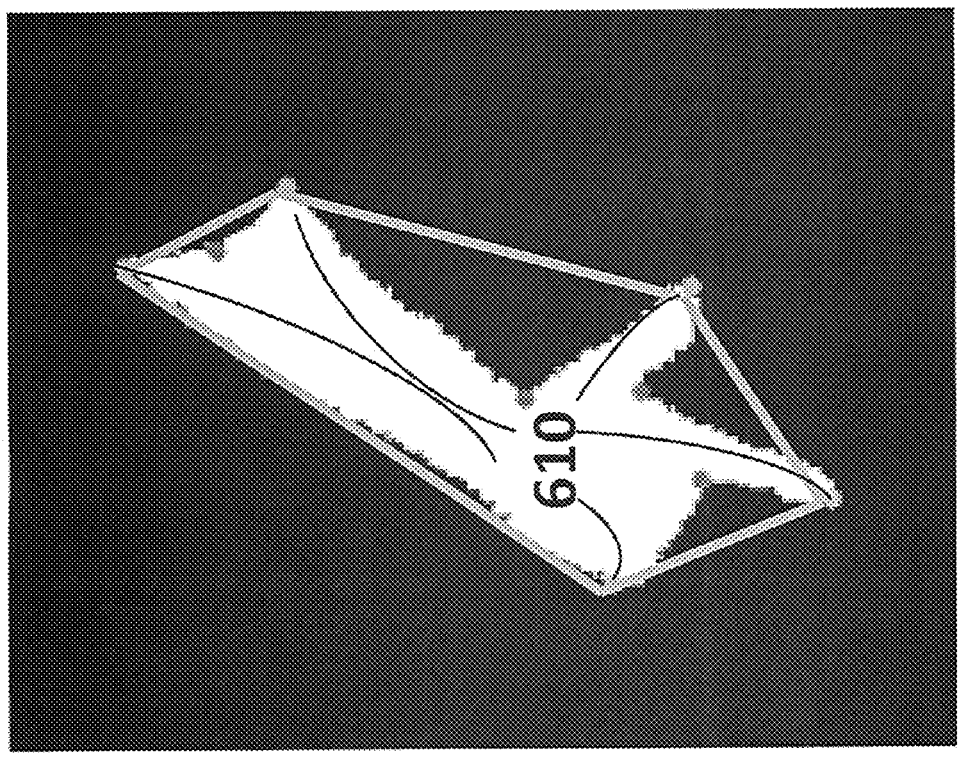
FIG. 21 illustrates a hand gesture with a polygon.
Figure 22:
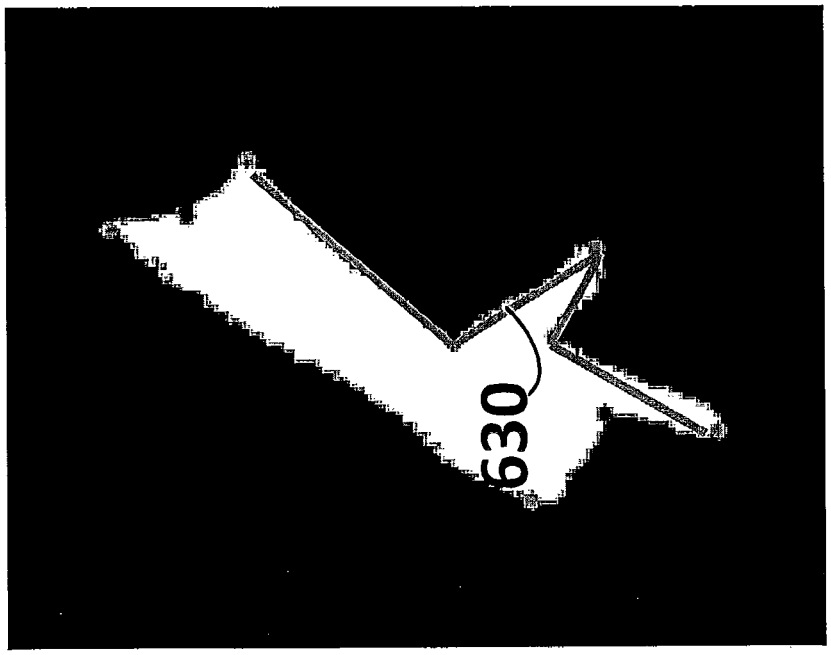
FIG. 22 illustrates multiple double-right-angle-structure.
Figure 22:
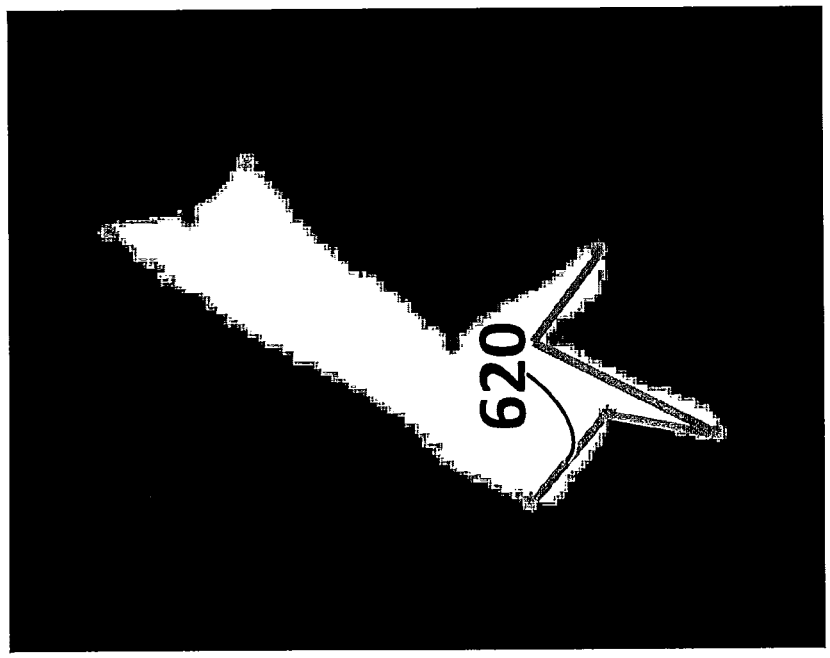

A feature of the "gesture 8" is that it has two right angles on both sides of the index finger which may be identified by a double right angle structure localization process 520. Therefore, for each of the blobs in the binary image, the system may initially determine if there are double-right-angle-structures to roughly classify as a potential hand or not a potential hand. Referring to FIG. 20, the boundary of a blob 600 is usually jittering, which can result in many vertices even on a straight line of the actual object making detecting the right angles difficult. Referring also to FIG. 21, a polygon approximation technique 610 may be applied on the blob so that vertices may be more readily determined. The resulting polygon of the vertices is a simpler representation of the original blob. The vertices on the polygon are salient aspects of the original shape. The polygon vertices may be classified as convex/concave by applying a convex hull fitting technique on the polygon. Those vertices which are on the convex hull are convex with the remaining vertices being concave vertices. Once all the concave vertices are found, the system may check any two neighboring concave vertices to see if both of their angles are close to 90 degrees. If the system identifies such neighboring concave vertices, then the system may consider them a double-right-angle-structure. The system may also identify the three neighboring convex vertices of these two vertices for hand alignment and normalization 530. Referring to FIG. 22, more than one double-right-angle-structure 620, 630 can be found within a single blob.

The hand alignment and normalization process 530 includes classifying a hand image by comparing a candidate to a set of existing hand templates. Since a hand in the captured image could be at an arbitrary orientation, it should be rotated to the same orientation as of those hands in the templates. Furthermore, different people have different hand sizes, and different camera distances could result in apparent different hand sizes. Accordingly, the comparisons should be done using a normalized hand size.

Figure 23:
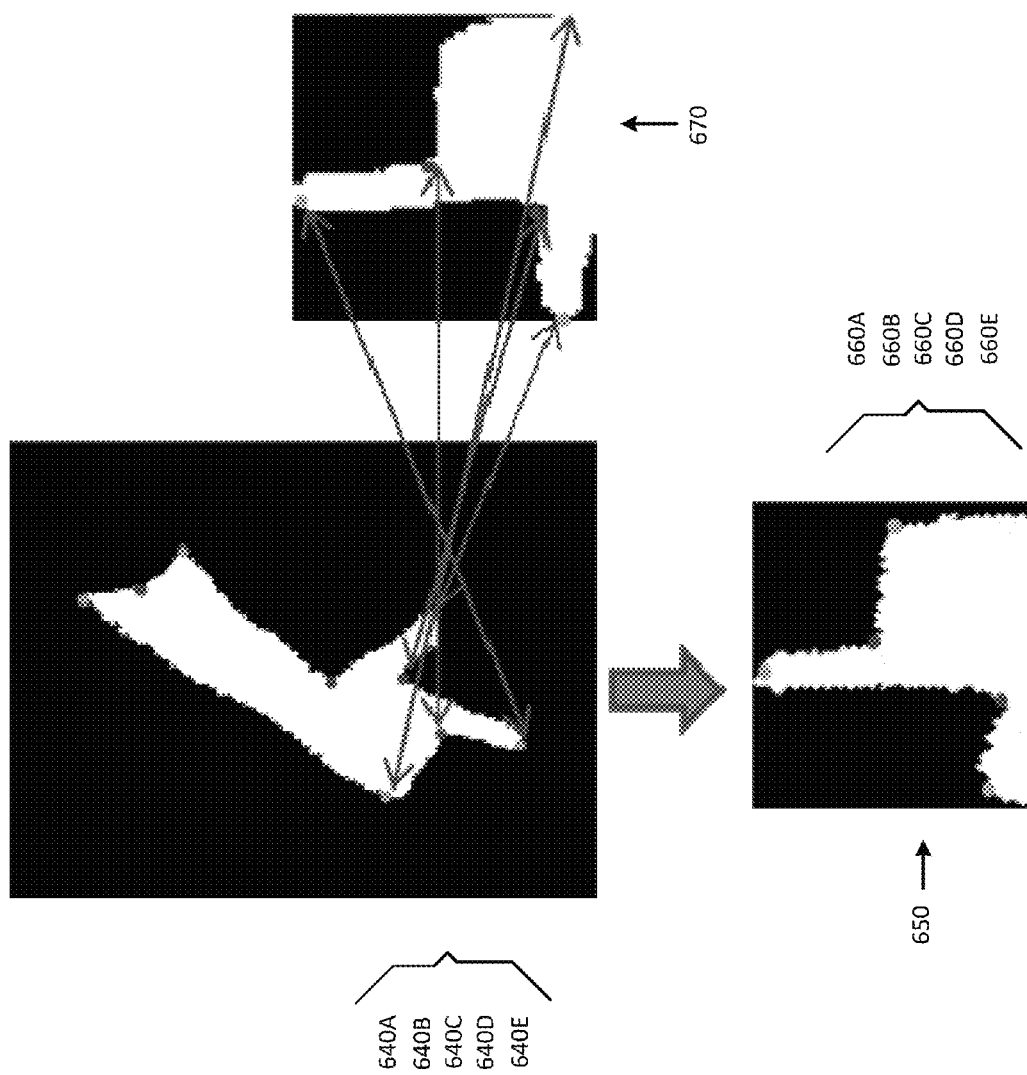
FIG. 23 illustrates double right angle structure identification.

Referring to FIG. 23, in the double-right-angle-structure, a total of five vertices 640A-640E of the structure may be identified. In the dataset of hand templates 650, the location of those five vertices 660A-660E may be manually marked. Thus, the one-one correspondences 670 between these five feature points may be established between a double-right-angle-structure and a hand template. Using these correspondences, an affine transformation may be estimated, such as using least square criteria, to align the double-right-angle-structure. After the affine transformation, both the hand orientation and scale is normalized to those of the hand template. Both the left and right hand may be aligned to a single right hand template, because the image of left hand is a horizontal flip of right hand.

Figure 24:
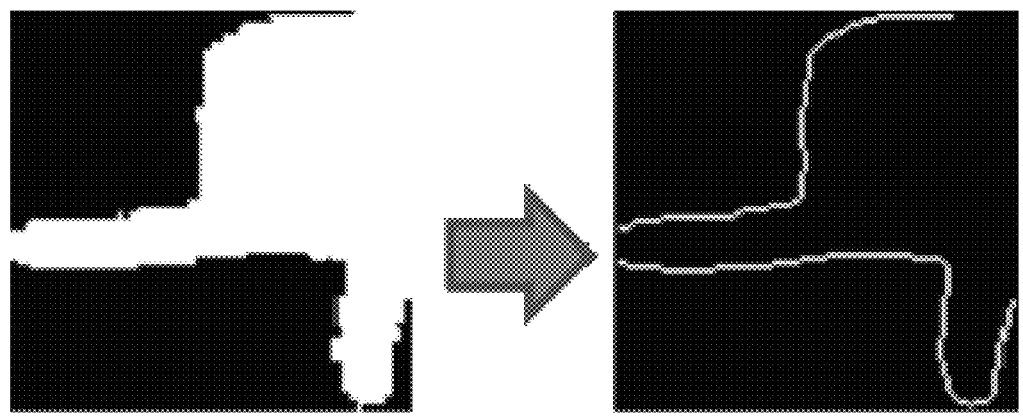
FIG. 24 illustrates hand shape classification.
Figure 24:
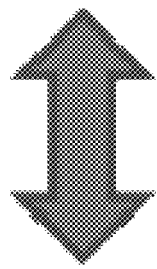
Figure 24:
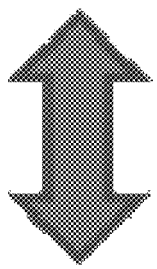
Figure 24:
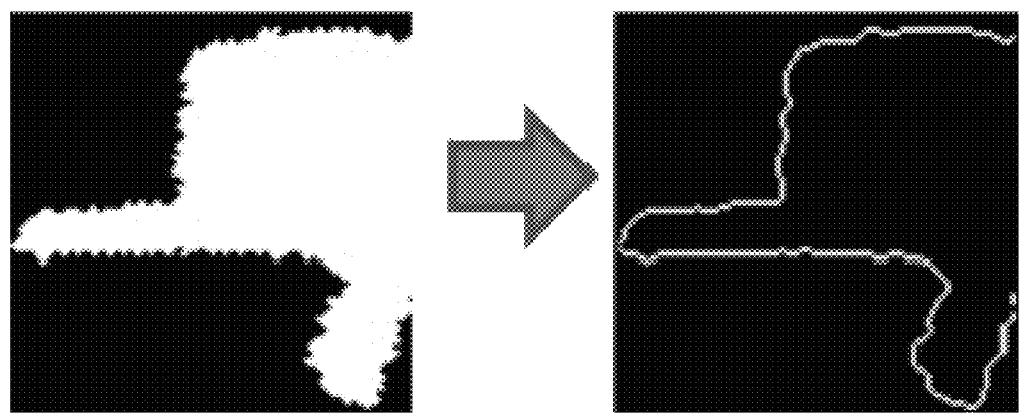

Referring to FIG. 24, a hand shape classification process 540 may be used to measure the similarity of the detected hand to the templates. The similarity to existing hand templates may consist of two parts: (1) comparing the hand shape to templates of hand shapes and (2) comparing the hand image to templates of hand color images. The shape comparison may be performed on binary images. After hand alignment and normalization 530, the binary mask of a hand may be normalized to a 100×100 image, which is preferably the same size as the templates.

A Hausdorff Distance may be used as the metric to measure the similarity between two shapes. The two binary images of hand shapes are converted to edge images. For each point on the input edge image, the system may find its closest distance to the edge points in template image. The largest of all these closest distances is defined as Hausdorff Distance between these two shapes.

Figure 25:
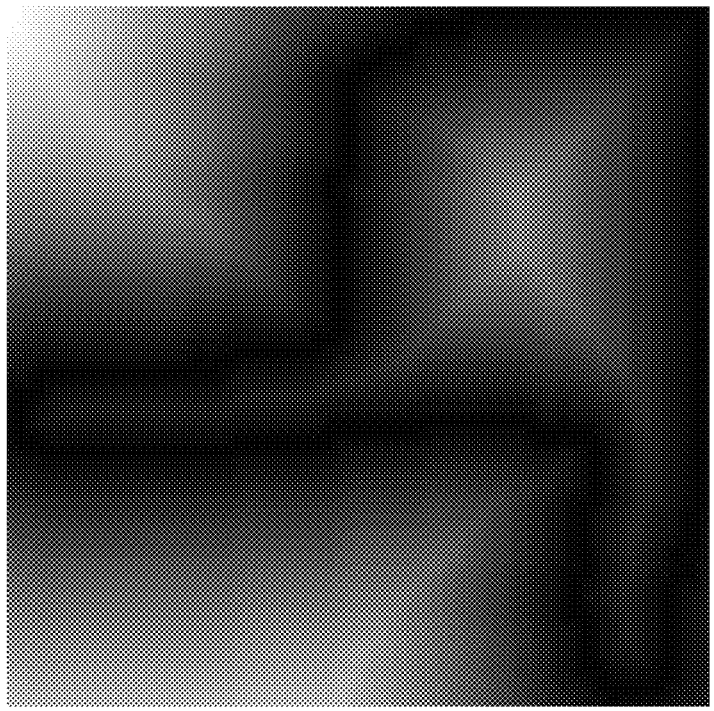
FIG. 25 illustrates calculating a distance map from an edge image.
Figure 25:
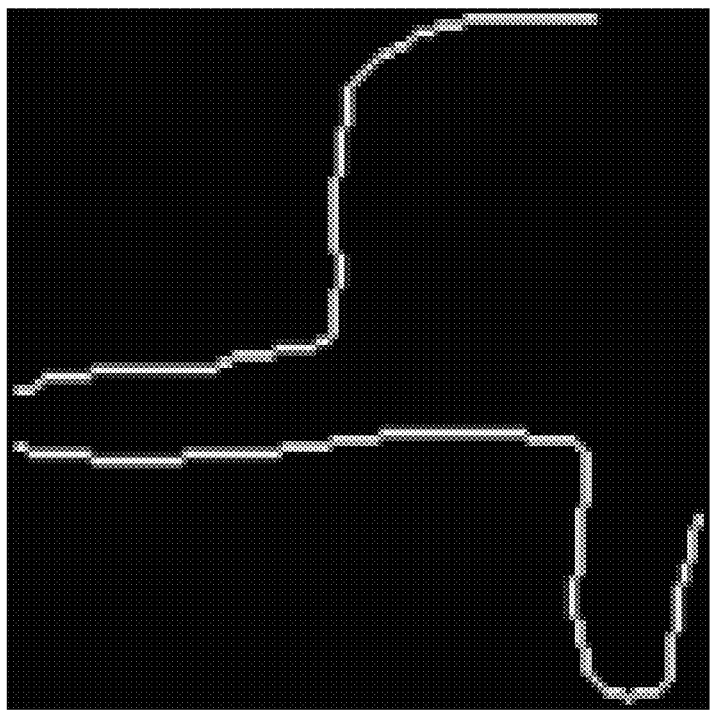

Referring to FIG. 25, to accelerate the Hausdorff Distance computation the edge image 700 may be changed into a distance map 710 using a distance transformation technique. This distance transformation may be done once and the result distance map can be re-used for all incoming hand candidates. The input hand edge map is convolved with the distance map. Instead of adding up pixel-wise convolution values, the system may find the largest value to get the Hausdorff Distance. A shape having Hausdorff Distance smaller than a certain threshold is passed to a color image comparison, and those greater than or equal to the threshold are discarded.

A hand gesture classification technique 550 may be used to determine what type of hand gesture is made so that subsequent lighting changes may be made, as desired. The hand shape classification process 540 provides candidate images which have a similar shape to a hand template. To further refine the results, the system may include an additional examination on the color image of the candidate gesture. Since the color image of "gesture 8" varies from hand to hand, it's not reliable to only compare it to a single template using template matching technique and it is undesirable to compare it to all the templates in the database. To reduce the computational complexity, the system may leverage the training based framework for gesture 8 recognition.

The local object appearance and shape within an image may be described by a distribution of intensity gradients and/or edge directions, which may be characterized by a histogram of oriented gradients (HOG) features for the feature representation. The HOG descriptor operates on localized cells, and is invariant to geometric and photometric transformations, except for object orientation. The gesture 8 is rotated to a known direction by the system during the identification process, which reduces the computational complexity of the HOG descriptor comparisons since only one orientation needs to be computed for the identified object. The HOG descriptor may be selected to be 16 by 16, the cell size may be selected to be 8 by 8, the number of bins may be selected to be 9, resulting in the dimension of the HOG descriptor for each image being 1764. Once the feature representation using Histogram of Oriented Gradient descriptors is achieved, the resulting descriptors may be used in a recognition process, such as one based upon supervised learning. For example, the gesture recognition may be a binary classification using support vector machine techniques.

Figure 26:
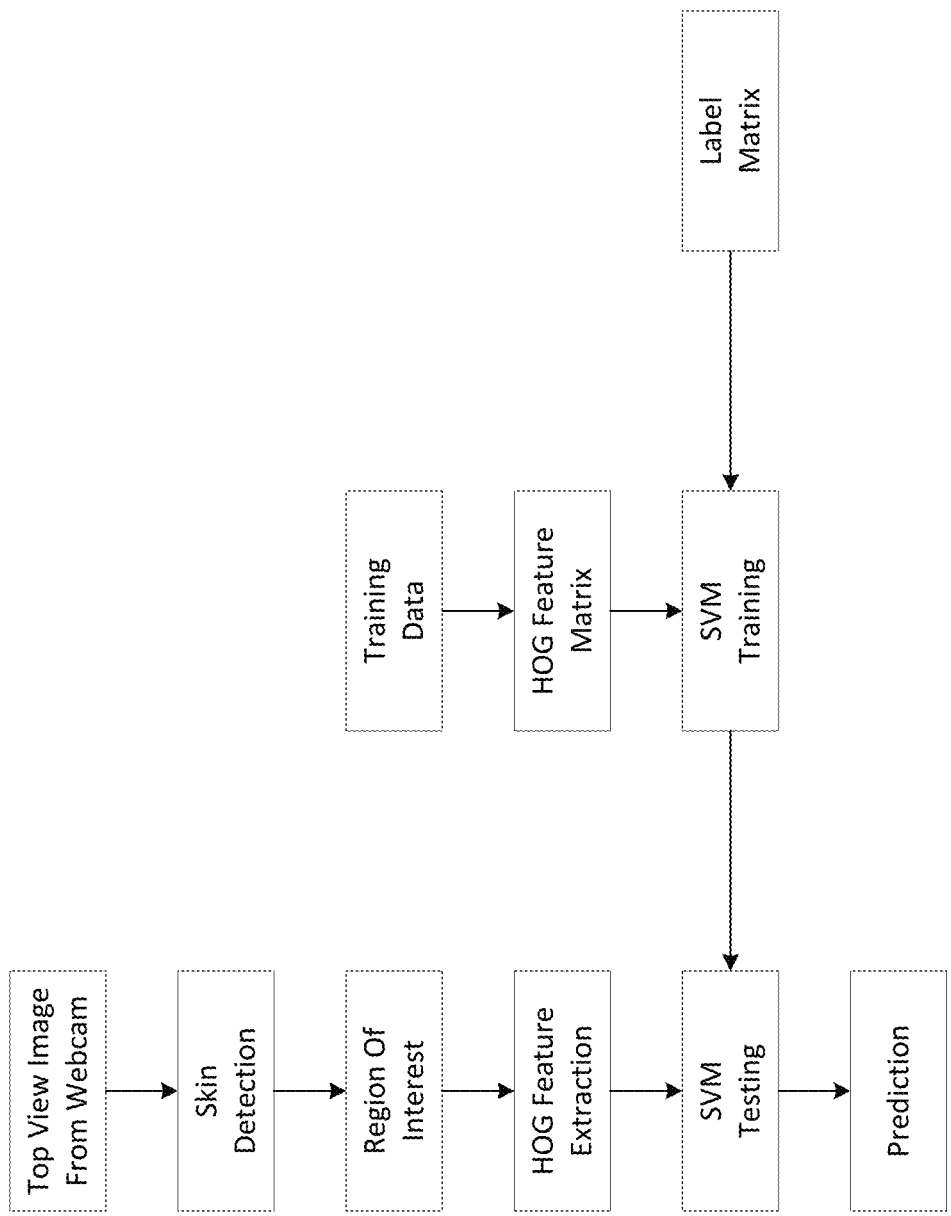
FIG. 26 illustrates a training stage.

Referring to FIG. 26, in the training stage, the system may collect the positive examples and the negative examples where the positive examples only have the gesture 8 and the negative examples include anything content except the gesture 8. The support vector machine (SVM) may be utilized for training the binary classifier with a Gaussian radial basis function (RBF) kernel. The C-SVM may be utilized and the capacity of SVM C may be set to be 10. Each training image can be of a different size and are preferably normalized into the size of 64 by 64. Thus, the HOG feature matrix may be of the size 1764 by N where N is the total number of the training images. In the label matrix, the positive training images are labeled as 1 and the negative training images are labeled as 0. The trained classifier is preferably implemented offline. The trained classifier may be represented as the coefficients of the trained support vectors.

With the trained classifier for the particular gesture available, the system may perform the hand gesture detection and recognition process. The size of each candidate gesture 8 may be different and are preferably resized to 64 by 64. The HOG feature may be extracted from this normalized region. Then, the trained SVM classifier is loaded for prediction of the gesture.

Figure 27:
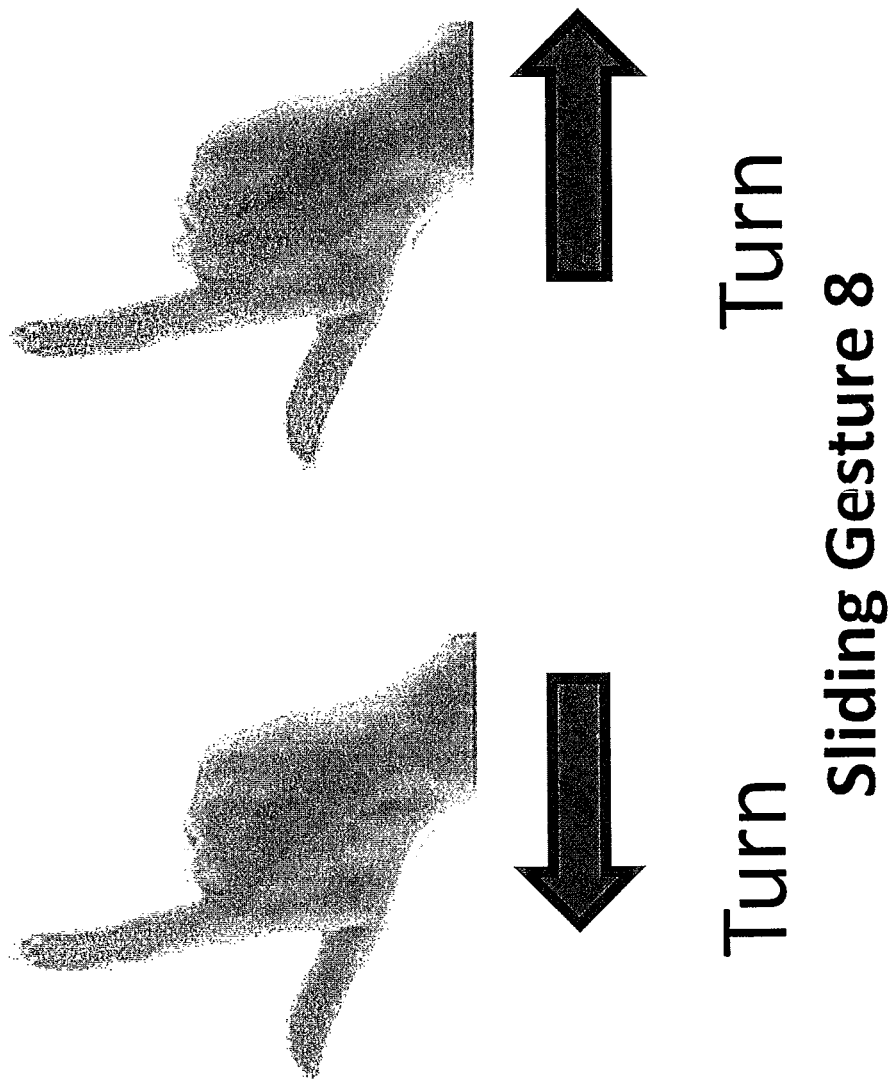
FIG. 27 illustrates light brightness tuning.

Referring to FIG. 27, light brightness tuning may be implemented by a sliding gesture 8 along the thumb direction, where sliding towards thumb direction turns up light brightness, and vice versa. Tracking of gesture 8 may be based on determining its direction and speed. For example, the gesture 8 tracking may be connecting the detections of the gesture 8 of each frame together. If multiple gesture 8s are detected in a single frame, or sequence of frames, then the one with maximum similarity score is preferably selected. The similarity score between a gesture 8 and previously detected one is preferably a weighted combination of their spatial distance, their size similarity, their color similarity, and/or their orientation similarity. The speed and direction of the gesture 8 is computed for each frame by two neighboring detections. In particular, the system may use the movement of the tip of thumb as that of the gesture, assuming that the gesture is rigid during movement.

Figure 28:
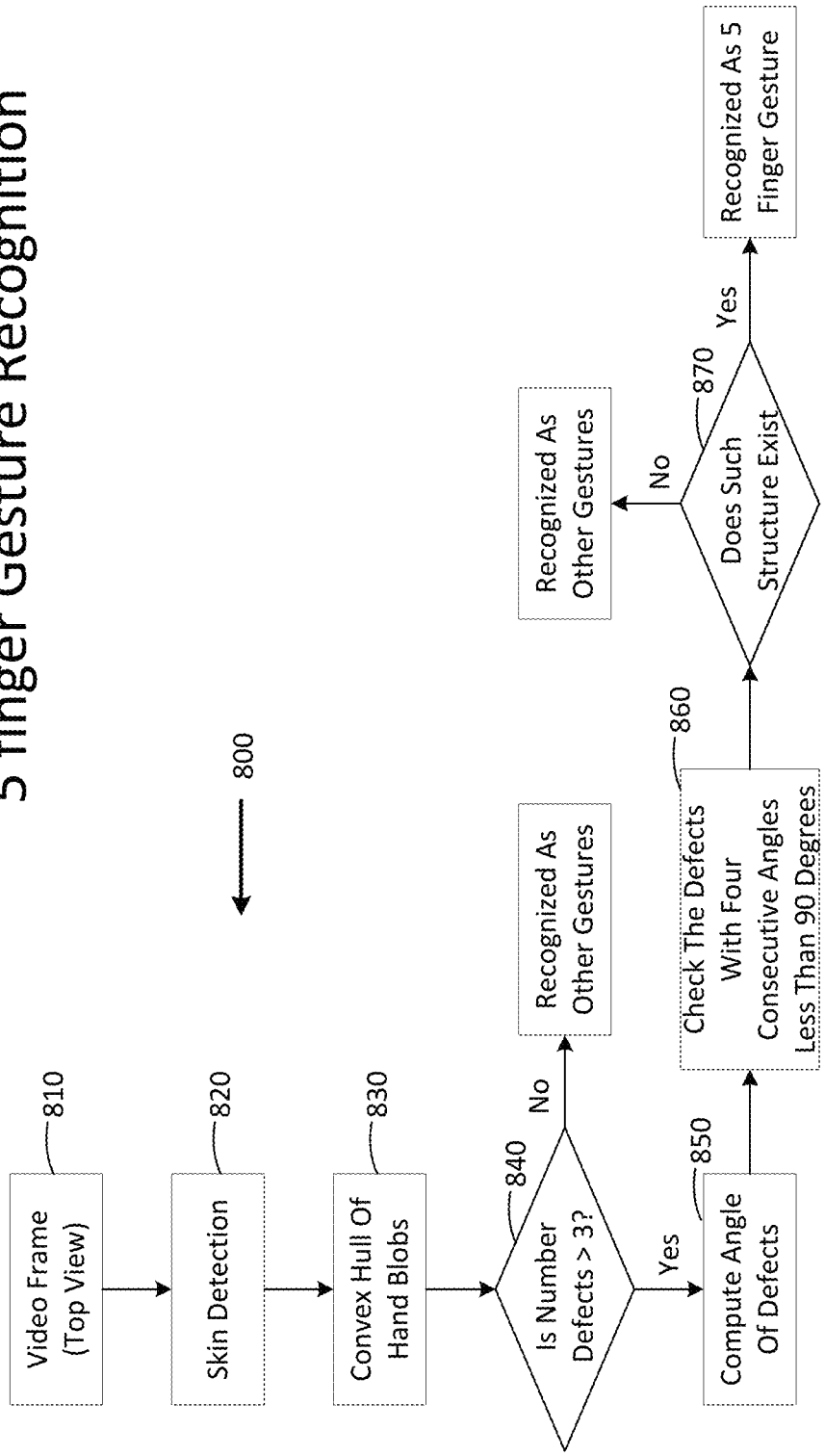
FIG. 28 illustrates 5 finger gesture recognition.

Referring to FIG. 28, a technique for the 5 finger gesture recognition technique 800 is illustrated. The 5 finger gesture recognition preferably uses five steps. The first step is the imaging device to capture "real time" video of a moving hand 810. The camera capture of the real time video of the moving hand in front of system and hand segmentation is performed based on a skin filter 820. Second, convex hull is for each connected component in the skin blobs 830. Third, the number of defects 840 is calculated and the angles between two fingers using coordinates of the finger tips and the defects in current image frame of video is calculated. Fourth, a set of filters 850, 860 are applied to filter out false positives from the detection. Fifth, the 5 finger gesture is recognized 870 in the cropped hand image, which is a continuous process for different image frames in the video.

As previously described the skin filter may be based on the current input image frame of video. It may be based on HSV space (can also be based on YCbCr space). The skin filters may be used to create a binary image with background in black color and the hand region in white. There can be several errors in the output image of skin filter step. To remove these errors, after skin detection, the system may perform a connected component analysis. The only limitation of this filter is that the blob for hand should be the biggest one. For the largest component, the system may utilize the convex hull to find finger tips. Convex hull is basically the convex set enclosing the hand region with the polygon. The polygon is a convex set. Basically, it means that if we take two points in the polygon and join them to form a line. The line entirely lies inside the set.

Figure 29:
FIG. 29 illustrates finger point identification.

Referring to FIG. 29, for example, there are many identified defect points 900. For example, between two finger tips there is a defect point in the valley. The output of the convex hull provides the coordinates of these defect points. Since sometimes the detected defects in the convex hull also include other joints from the wrists, elbows and arms, in order to be more robust in the gesture recognition, these false positives are removed and with preferably only the valid defect points being counted It may be observed that the angle between two fingers cannot be more than 90 degrees. This feature may be used to filter out the false defects. The angle of the defects may be determined as follows:

$$\theta = \arccos\left(\frac{a^2 + b^2 - c^2}{2ab}\right).$$

Figure 30:
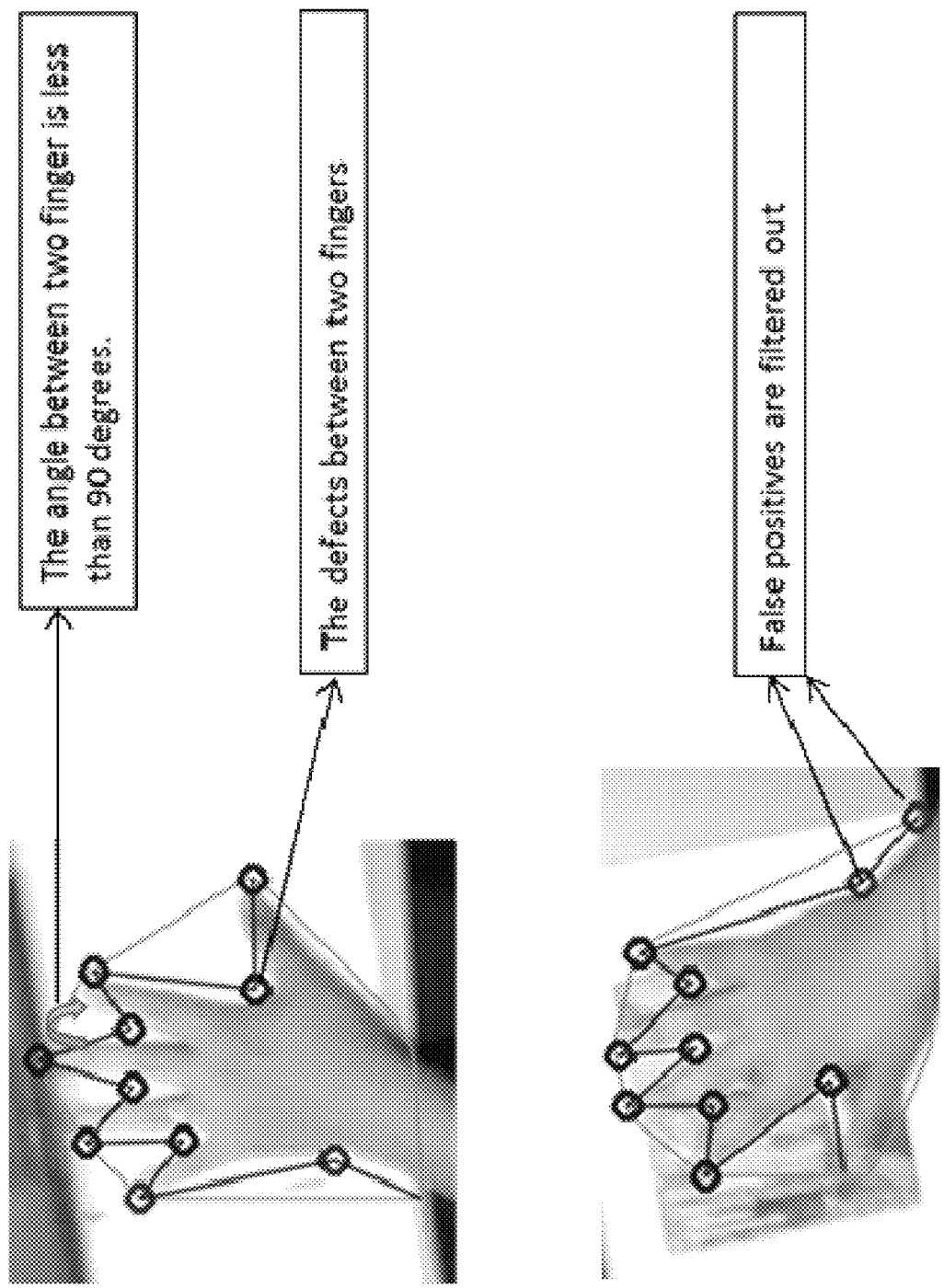
FIG. 30 illustrates 5 finger gesture determination by group detection.

Referring to FIG. 30 the system may determine the structure of the 5 finger gestures by detection of the group of four consecutive angles which are less than 90 degrees. If such a structure exists, the technique recognizes the gesture as the 5 finger gesture.

Figure 31:
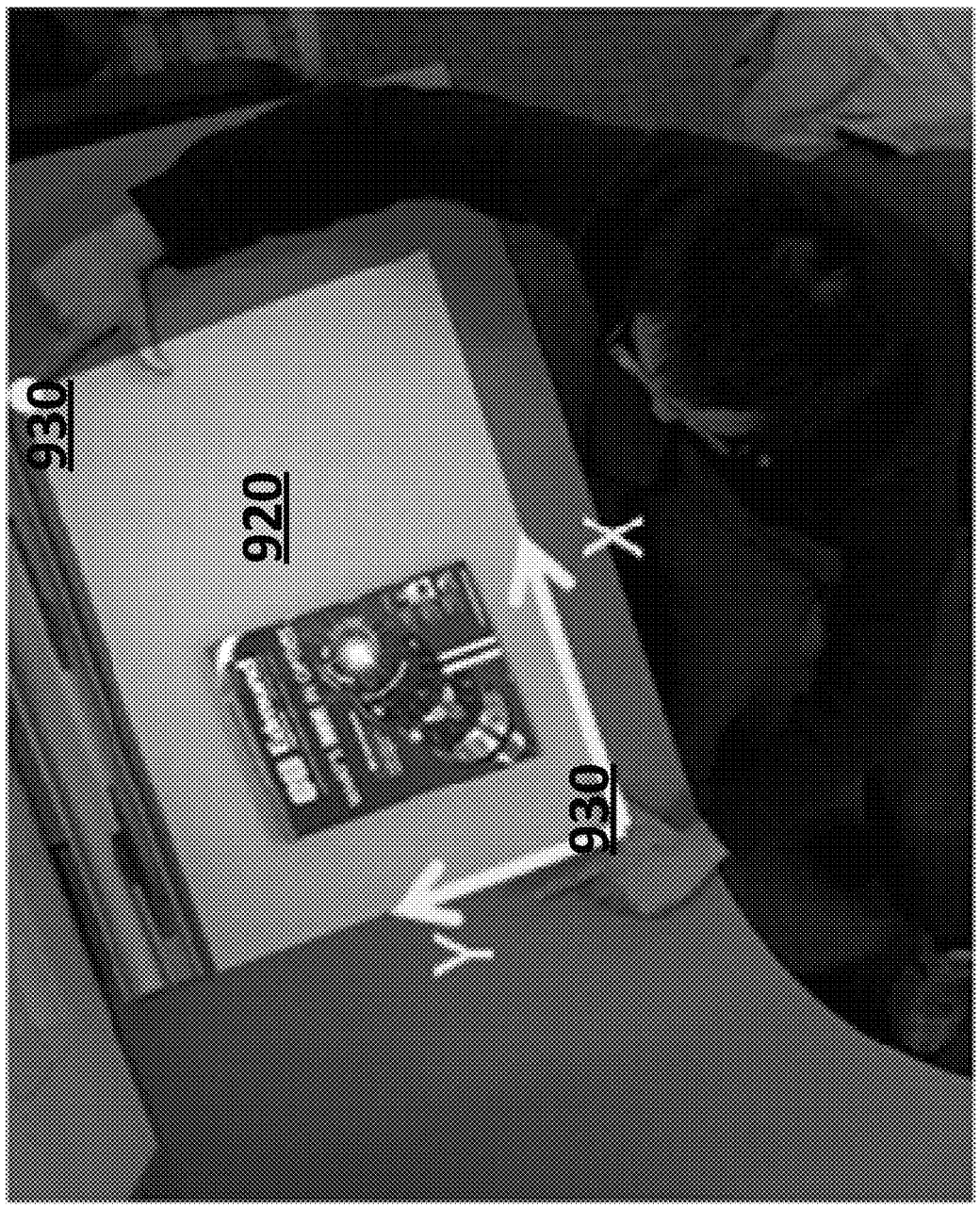
FIG. 31 illustrates automatic lighting control.

Referring to FIG. 31, the automatic lighting control, as previously described, may be realized by activity detection. As previously described, the system detects two user activities: reading and writing, and computer work. Reading may be defined as hand presence in the region of reading and writing 920, and computer work may be defined as hand presence in region of keyboard/mouse. These two regions may be defined before use of the system. A user may use the gesture 8 of both hands 930 to define these two regions one by one. A user can define a rectangle area using two hands of gesture 8. The left hand gesture 8 defines a coordinate system where origin is at the valley point between thumb and index finger. The x+ axis is aligned with the thumb direction and y+ axis is perpendicular to x+ axis. Right hand gesture 8 defines another corner point of the rectangle. Specifically, the tip of index finger is used. In this way, a user can define both reading and writing, and computer work regions. The system stores these two regions for activity recognition later.

The modification of the lighting may be based upon the ambient light levels of the environment. In particular, the modification of the lighting is preferably based upon the ambient light levels sensed by the imaging device. In this manner, if the ambient light levels are relatively low then relatively high additional light may be provided. In this manner, if the ambient light levels are higher then relatively low additional light may be provided. The light levels may be based upon the user's preferences, including for example, the day, the week, the month, the season, their circadian cycle, the time of day, their exposure to light, etc. It is also to be understood that the viewer and user are used interchangeably, and are not necessarily related to whether the person is viewing a particular object.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for modifying the illumination of a lighting system comprising:
   (a) sensing a set of images using an image capture device focused on a region of interest in the vicinity of a viewer and showing a computer device;
   (b) discriminating a semantic meaning of said viewer's task between (1) at least one of reading and writing in said region of interest and (2) using a keyboard of said computer, based on a detection of a location of a hand of said viewer relative to said computer device;
   (c) selectively modifying said illumination in a different manner, in response to said discriminating said semantic meaning of said task of said viewer as one of (1) said at least one of reading and writing in said region of interest, and (2) said using said keyboard of said computer.

2. The method of claim 1 including the steps of:
   (a) discriminating a shape of said hand to identify a gesture of said hand;
   (b) in response to an identified said gesture, selectively further modifying said illumination.

3. The method of claim 2 including the step of changing from an automatic mode to a manual mode.

4. The method of claim 3 wherein changing from said automatic mode to said manual mode is based upon said gesture.

5. The method of claim 4 including the step of changing from said manual mode to said automatic mode based upon discriminating a task.

6. The method of claim 2 wherein said discriminated said shape of said hand is a hand with all fingers curled except for the thumb and index finger, which are extended.

7. The method of claim 2 wherein said discriminated said shape of said hand is a "5 Finger Gesture" of one said hand.

8. The method of claim 2 wherein said discriminated said shape of said hand is a sliding hand with all fingers curled except for the thumb and index finger, which are extended.

9. The method of claim 2 wherein said discriminated said shape of said hand is a pair of "5 Finger Gesture" of two of said hand.

10. The method of claim 1 wherein said selective modifying said illumination is based upon a previous illumination of said lighting system.

11. The method of claim 1 wherein said region of interest is defined by said viewer.

12. The method of claim 1 including the step of identifying a temporal interval over which a candidate for the hand of said viewer does not move.

13. The method of claim 1 wherein said detection of a location of said viewer's hand is based upon skin color detection and motion detection.

14. The method of claim 13 including the step of using at least one template to track said location of said viewer's hand across multiple frames.

15. The method of claim 1 including the step of tracking the motion of said viewer's body when said hand is not detected, and further discriminating a semantic meaning of said viewer's task when said motion exceeds a threshold motion.

16. The method of claim 15 including the step of initiating a timer when the semantic meaning of said viewer's task can no longer be discriminated, and adjusting said illumination when said timer reaches a threshold time.

17. The method of claim 1 wherein said timer is canceled if the semantic meaning of said viewer's task is discriminated prior to said threshold being reached.

18. The method of claim 1 further comprising in response to said discriminating said semantic meaning of said task of said viewer and further based upon a temporal factor selectively modifying said spectra.

19. The method of claim 18 wherein said temporal factor is a time of day.

20. The method of claim 19 wherein an earlier said time of day uses an increased correlated color temperature.

21. The method of claim 20 wherein a later time of day uses a decreased said correlated color temperature.

22. The method of claim 18 wherein said modifying said spectra is based upon using a multi phosphor lighting system.

23. The method of claim 22 wherein said multi phosphor lighting system includes using a blue light source and two other phosphors.

24. A method for modifying the illumination of a lighting system comprising:
   (a) sensing a set of images of a region of interest in the vicinity of a viewer;
   (b) discriminating a semantic meaning of a viewer's task in said region of interest between (1) at least one of reading and writing and (2) using a computer;
   (c) in response to said discriminating said semantic meaning of said task of said viewer selectively modifying said illumination;
   (d) wherein said semantic meaning is said viewer reading a menu;
   (e) wherein said semantic meaning is based upon sensing reflective material on said menu.

* * * * *